US010177851B2

(12) United States Patent
Agazzi et al.

(10) Patent No.: US 10,177,851 B2
(45) Date of Patent: *Jan. 8, 2019

(54) COHERENT TRANSCEIVER ARCHITECTURE

(71) Applicant: INPHI CORPORATION, Santa Clara, CA (US)

(72) Inventors: Oscar Ernesto Agazzi, Santa Clara, CA (US); Diego Ernesto Crivelli, Cordoba (AR); Paul Voois, Ladera Ranch, CA (US); Ramiro Rogelio Lopez, Cordoba (AR); Jorge Manuel Finochietto, Cordoba (AR); Norman L. Swenson, Mountain View, CA (US); Mario Rafael Hueda, Cordoba (AR); Hugo Santiago Carrer, Mendiolaza (AR); Vadim Gutnik, Irvine, CA (US); Adrián Ulises Morales, Cordoba (AR); Martin Ignacio Del Barco, Cordoba (AR); Martin Carlos Asinari, Cordoba (AR); Federico Nicolas Paredes, Cordoba (AR); Alfredo Javier Taddei, Cordoba (AR); Mauro Marcelo Bruni, Cordoba (AR); Damian Alfonso Morero, Cordoba (AR); Facundo Abel Alcides Ramos, Cordoba (AR); María Laura Ferster, Cordoba (AR); Elvio Adrian Serrano, Cordoba (AR); Pablo Gustavo Quiroga, San Salvador de Jujuy (AR); Roman Antonio Arenas, Cordoba (AR); Matias German Schnidrig, Bialet Masse (AR); Alejandro Javier Schwoykoski, Cordoba (AR)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,765

(22) Filed: Jul. 12, 2017

(65) Prior Publication Data

US 2017/0317759 A1 Nov. 2, 2017

Related U.S. Application Data

(63) Continuation of application No. 15/148,645, filed on May 6, 2016, now Pat. No. 9,735,881, which is a (Continued)

(51) Int. Cl.
*H04B 10/00* (2013.01)
*H04B 10/516* (2013.01)
(Continued)

(52) U.S. Cl.
CPC .......... *H04B 10/516* (2013.01); *H04B 10/40* (2013.01); *H04B 10/61* (2013.01); *H04L 7/0075* (2013.01)

(58) Field of Classification Search
CPC ....... H04B 10/43; H04B 10/06; H04B 10/611
See application file for complete search history.

(56) References Cited

U.S. PATENT DOCUMENTS 9,337,934 B1 * 5/2016 Agazzi .................. H04B 10/61
2006/0022738 A1 * 2/2006 Dwelly ..................... G01S 7/34
327/308

(Continued)

OTHER PUBLICATIONS

Noise, IEEE Photonics Technology Letters, Mar. 15, 2010, pp. 380-382, vol. 22, No. 6.

(Continued)

*Primary Examiner* — Dzung Tran
(74) *Attorney, Agent, or Firm* — Richard T. Ogawa; Ogawa P.C.

(57) ABSTRACT

A coherent receiver comprises an ingress signal path having an ingress line-side interface, and an ingress host-side inter- (Continued)

face. The ingress signal path is configured to receive an analog signal vector at the ingress line-side interface, to demodulate the analog signal vector, and to output a digital data signal Fat the ingress host-side interface. The coherent receiver also comprises clock and timing circuitry configured to receive a single reference clock signal and to provide a plurality of modified ingress path clock signals to different components of the ingress signal path, the plurality of modified ingress path clock signals derived from the single reference clock signal and the plurality of modified ingress path clock signals having different clock rates. The receiver, transmitter, or transceiver can operate in a plurality of programmable operating modes to accommodate different modulation/de-modulation schemes, error correction code schemes, framing/mapping protocols, or other programmable features.

20 Claims, 22 Drawing Sheets

Related U.S. Application Data continuation of application No. 14/093,306, filed on Nov. 29, 2013, now Pat. No. 9,337,934.

(60) Provisional application No. 61/883,112, filed on Sep. 26, 2013, provisional application No. 61/832,630, filed on Jun. 7, 2013, provisional application No. 61/832,611, filed on Jun. 7, 2013, provisional application No. 61/832,571, filed on Jun. 7, 2013, provisional application No. 61/789,331, filed on Mar. 15, 2013, provisional application No. 61/738,293, filed on Dec. 17, 2012, provisional application No. 61/738,284, filed on Dec. 17, 2012, provisional application No. 61/738,298, filed on Dec. 17, 2012, provisional application No. 61/731,392, filed on Nov. 29, 2012.

(51) Int. Cl.
  *H04B 10/40* (2013.01)
  *H04B 10/61* (2013.01)
  *H04L 7/00* (2006.01)

(56) References Cited

U.S. PATENT DOCUMENTS

| 2012/0252387 | A1 | 10/2012 | Haskins et al. | |
|---|---|---|---|---|
| 2014/0036937 | A1* | 2/2014 | Doerr | H04B 10/40 370/535 |
| 2014/0269785 | A1* | 9/2014 | Branlund | H04B 1/40 370/537 |
| 2015/0022385 | A1* | 1/2015 | D'Souza | H03M 1/1071 341/120 |

OTHER PUBLICATIONS

Agazzi, O. et al., "Timing Recovery in Digital Subscriber Loops", IEEE Transactions on Communications, Jun. 1985, pp. 558-569, vol. COM-33, No. 6.

Messerschmitt, D.G., "Frequency Detectors for PLL Acquisition in Timing and Carrier Recovery", IEEE Transactions on Communications, Sep. 1979, pp. 1288-1295, vol. COM-27, No. 9.

Pfau, T. et al., "Hardware-Efficient Coherent Digital Receiver Concept with Feedforward Carrier Recovery for M-QAM Constellations", Journal of Lightwave Technology, Apr. 15, 2009, pp. 989-999, vol. 27, No. 8.

Wu, X. et al., "Iterative Carrier Recovery in Turbo Receivers with Distributed Pilots", in IEEE International Conference on Consumer Electronics, Communications and Networks (CECNet), Apr. 2011, pp. 5024-5026.

Zhang, H. et al., "Cycle Slip Mitigation in POLMUX-QPSK Modulation", in Optical Fiber Communication Conference and Exposition (OFC/NFOEC), 2011 and the National Fiber Optic Engineers Conference, Mar. 2011, pp. 1-3.

Zhang, S. et al., Pilot-Assisted Decision-Aided Maximum-Likelihood Phase Estimation in Coherent Optical Phase-Modulated Systems with Nonlinear Phase.

United States Office Action, U.S. Appl. No. 14/093,306, dated May 22, 2015, 9 pages.

\* cited by examiner

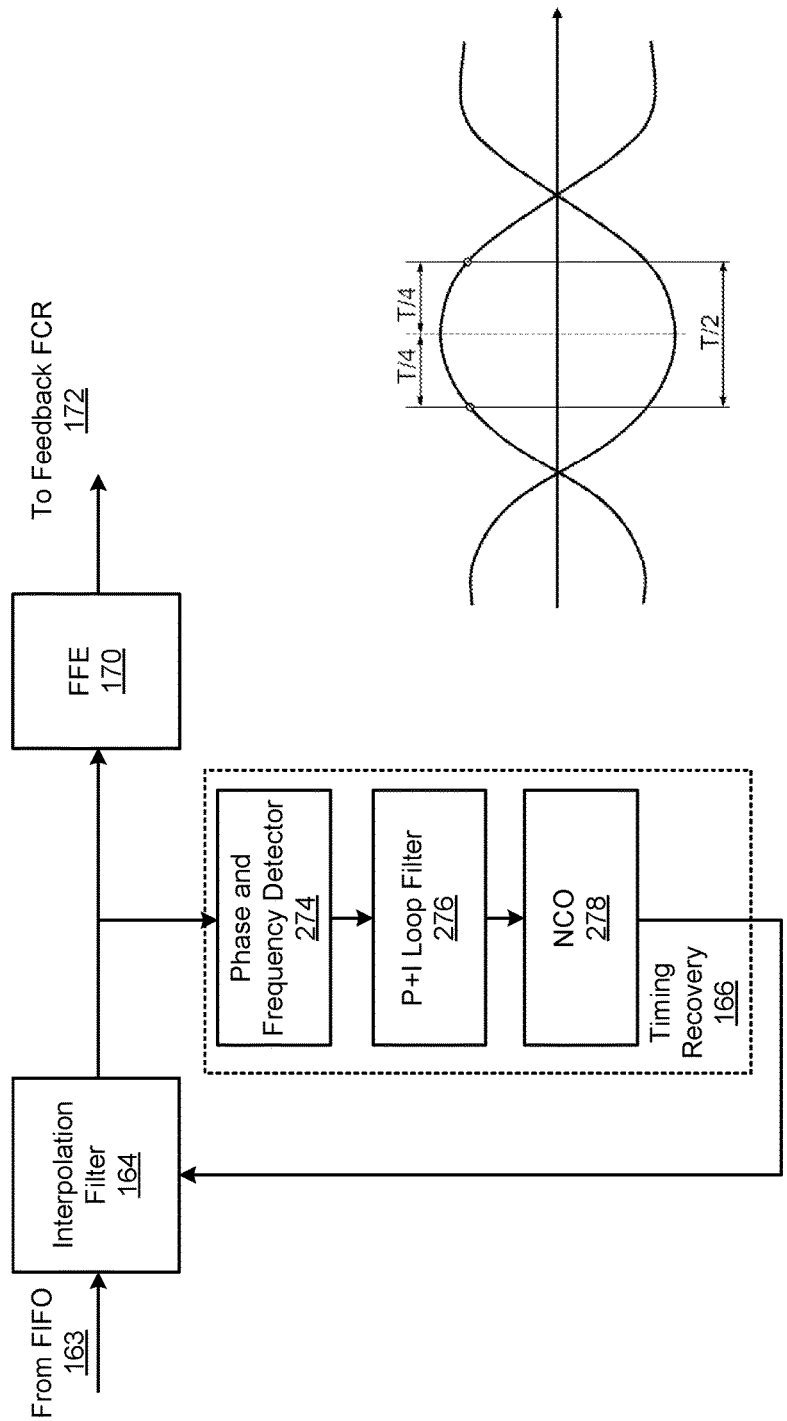

COHERENT TRANSCEIVER ARCHITECTURE

CROSS REFERENCE TO RELATED APPLICATIONS

This application is a continuation of U.S. patent application Ser. No. 15/148,645, filed on May 6, 2016, which is a continuation of U.S. patent application Ser. No. 14/093,306 (now U.S. Pat. No. 9,337,934) entitled "Coherent Transceiver Architecture," filed on Nov. 29, 2013, which claims the benefit of the following U.S. Provisional Applications: U.S. Provisional Application No. 61/731,392 entitled "Clocking Architecture for Analog Front End And Digital Blocks Split Into Multiple Clock Domains," filed on Nov. 29, 2012 to Vadim Gutnik, et al.; U.S. Provisional Application No. 61/738,284 entitled "Coherent Optical Transceiver," filed on Dec. 17, 2012 to Diego E. Crivelli, et al.; U.S. Provisional Application No. 61/738,293 entitled "Coherent Optical Transceiver" filed on Dec. 17, 2012 to Diego E. Crivelli, et al.; U.S. Provisional Application No. 61/738,298 entitled "Coherent Optical Transceiver with 100 G/200 G Host-Side Selectable Line Card Architecture," filed on Dec. 17, 2012 to Ramiro Lopez, et al.; U.S. Provisional Application No. 61/789,331 entitled "Coherent Optical Transceiver," filed on Mar. 15, 2013 to Paul Voois, et al; U.S. Provisional Application No. 61/832,571 entitled "Coherent Optical Transceiver," filed on Jun. 7, 2013 to Paul Voois, et al; U.S. Provisional Application No. 61/832,611 entitled "Coherent Optical Transceiver," filed on Jun. 7, 2013 to Paul Voois, et al; U.S. Provisional Application No. 61/832,630 entitled "Coherent Optical Transceiver," filed on Jun. 7, 2013 to Paul Voois, et al; and U.S. Provisional Application No. 61/883,112 entitled "Clocking Scheme for a Coherent Optical Transceiver," filed on Sep. 26, 2013 to Diego Ernesto Crivelli, et al. The contents of each of the above-referenced applications are incorporated by reference herein.

This application is related to U.S. patent application Ser. No. 13/406,452 (now U.S. Pat. No. 8,918,694) entitled "Non-Concatenated FEC Codes for Ultra-High Speed Optical Transport Networks," filed on Feb. 27, 2012 to Damian Alfonso Morero, et al. and to U.S. patent application Ser. No. 13/655,302 (now U.S. Pat. No. 9,071,364) entitled "Coherent Optical Transceiver with Programmable Application Modes," to Paul Voois, et al. The contents of the above-referenced Applications are incorporated by reference herein.

TECHNICAL FIELD

The disclosed embodiments relate generally to communication systems, and more specifically, to a transceiver architecture for low power optical transmission.

BACKGROUND

Worldwide demand for Internet bandwidth is growing rapidly each year, driven largely by video demand and the prevalence of mobile devices. Coherent transmission is a class of modulation technology that are commonly used for 100 G or faster dense wavelength division multiplexing (DWDM) optical networks. In coherent transmission, the transmitter modulates both phase and amplitude of the optical carrier. Coherent transmission is particularly well suited for long haul networks, where maximizing fiber capacity is an important consideration.

SUMMARY

In a first embodiment, a coherent transmitter comprises an egress signal path having an egress line-side interface and an egress host-side interface. The egress signal path is configured to receive a digital data signal at the egress host-side interface, to modulate the digital data signal, and to output a first analog signal vector corresponding to the digital data signal at the egress line-side interface. The coherent transmitter further comprises clock and timing circuitry configured to receive a single reference clock signal and to provide a plurality of modified egress path clock signals to different components of the egress signal path, the plurality of modified egress path clock signals derived from the single reference clock signal and the plurality of modified egress path clock signals having different clock rates.

In a second embodiment, a coherent receiver comprises an ingress signal path having an ingress line-side interface, and an ingress host-side interface. The ingress signal path is configured to receive an analog signal vector at the ingress line-side interface, to demodulate the analog signal vector, and to output a digital data signal at the ingress host-side interface. The coherent receiver also comprises clock and timing circuitry configured to receive a single reference clock signal and to provide a plurality of modified ingress path clock signals to different components of the ingress signal path, the plurality of modified ingress path clock signals derived from the single reference clock signal and the plurality of modified ingress path clock signals having different clock rates.

In a third embodiment, a coherent transceiver comprises an egress signal path comprising an egress line-side interface and an egress host-side interface, the egress signal path configured to receive a first digital data signal at the egress host-side interface, to modulate the first digital data signal, and to output a first analog signal vector corresponding to the first digital data signal at the egress line-side interface. The coherent transceiver further includes an ingress signal path comprising an ingress line-side interface, and an ingress host-side interface, the ingress signal path configured to receive a second analog signal vector at the ingress line-side interface, to demodulate the second analog signal vector, and to output a second digital data signal at the ingress host-side interface. The coherent transceiver further includes clock and timing circuitry configured to receive a single reference clock signal and to provide a plurality of modified egress path and ingress path clock signals to different components of the egress signal path and the ingress signal path, the plurality of modified egress path and ingress path clock signals derived from the single reference clock signal and the plurality of modified egress path and ingress path clock signals having different clock rates.

BRIEF DESCRIPTION OF THE DRAWINGS

FIGS. 3a-3c illustrate timing recovery and interpolative circuit elements (e.g., interpolation filters) for performing sampling rate conversions along the transceiver egress and/or ingress paths, in accordance with some embodiments.

Like reference numerals refer to corresponding parts throughout the drawings.

DESCRIPTION OF EMBODIMENTS

An integrated coherent transceiver processes data for communication over an optical channel. The transceiver programmably supports multiple baud rates data rates, sampling rates, clock rates and modulations. In some embodiments, a given baud rate may correspond to multiple data rates. Furthermore, different components of the transceiver may receive and process data at different sampling rates or clock rates. The receiver, transmitter, or transceiver can operate in a plurality of programmable operating modes to accommodate different modulation/de-modulation schemes, error correction code schemes, framing/mapping protocols, or other programmable features. In various operating modes, components of the transceiver not being used in that particular mode may be shut down or bypassed for power saving.

Figure 1A:
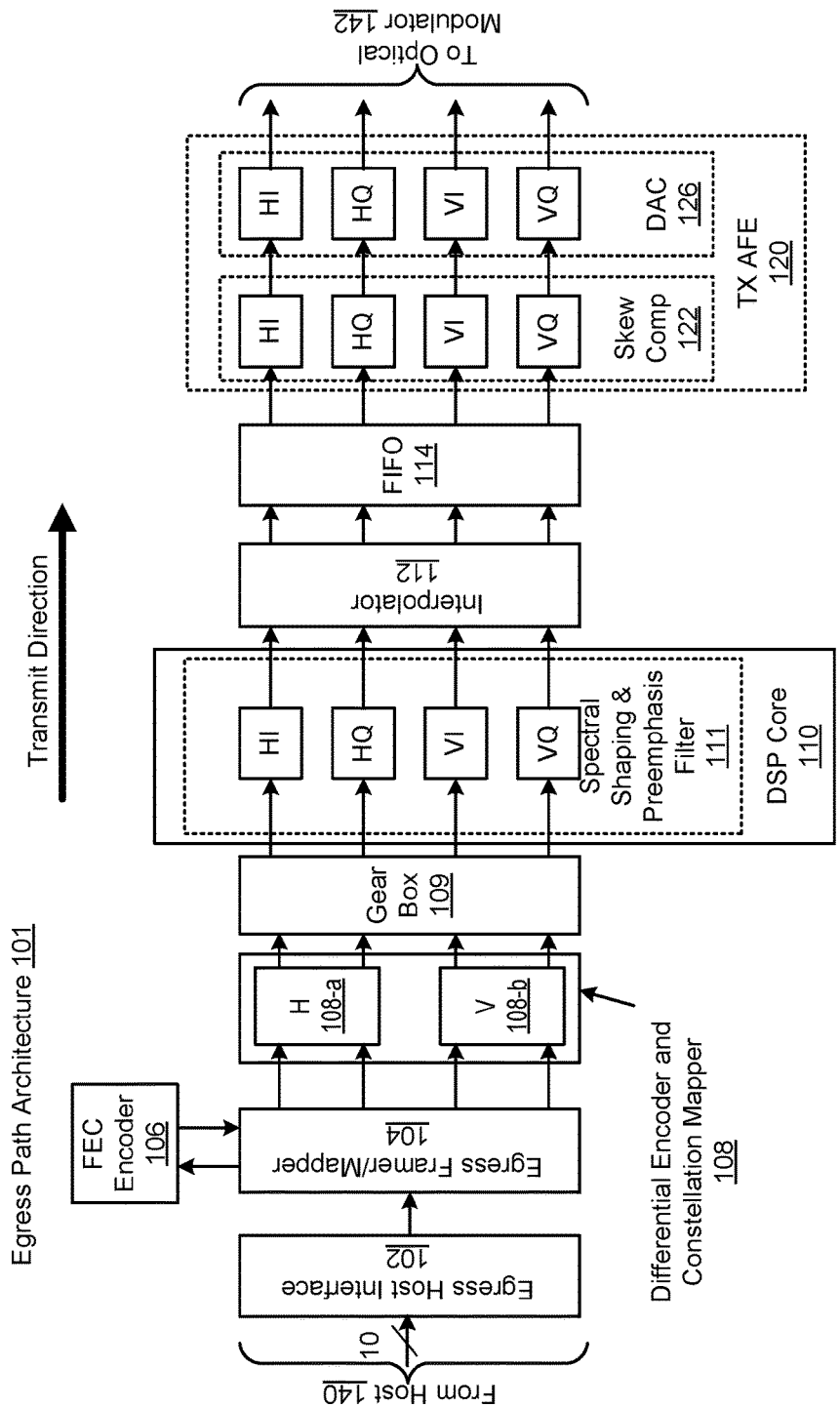
FIGS. 1a-1b include block diagrams illustrating architectures of a coherent transceiver egress (e.g., transmit) path (FIG. 1a) and a coherent transceiver ingress (e.g., receive) path (FIG. 1b), in accordance with some embodiments.
Figure 1B:
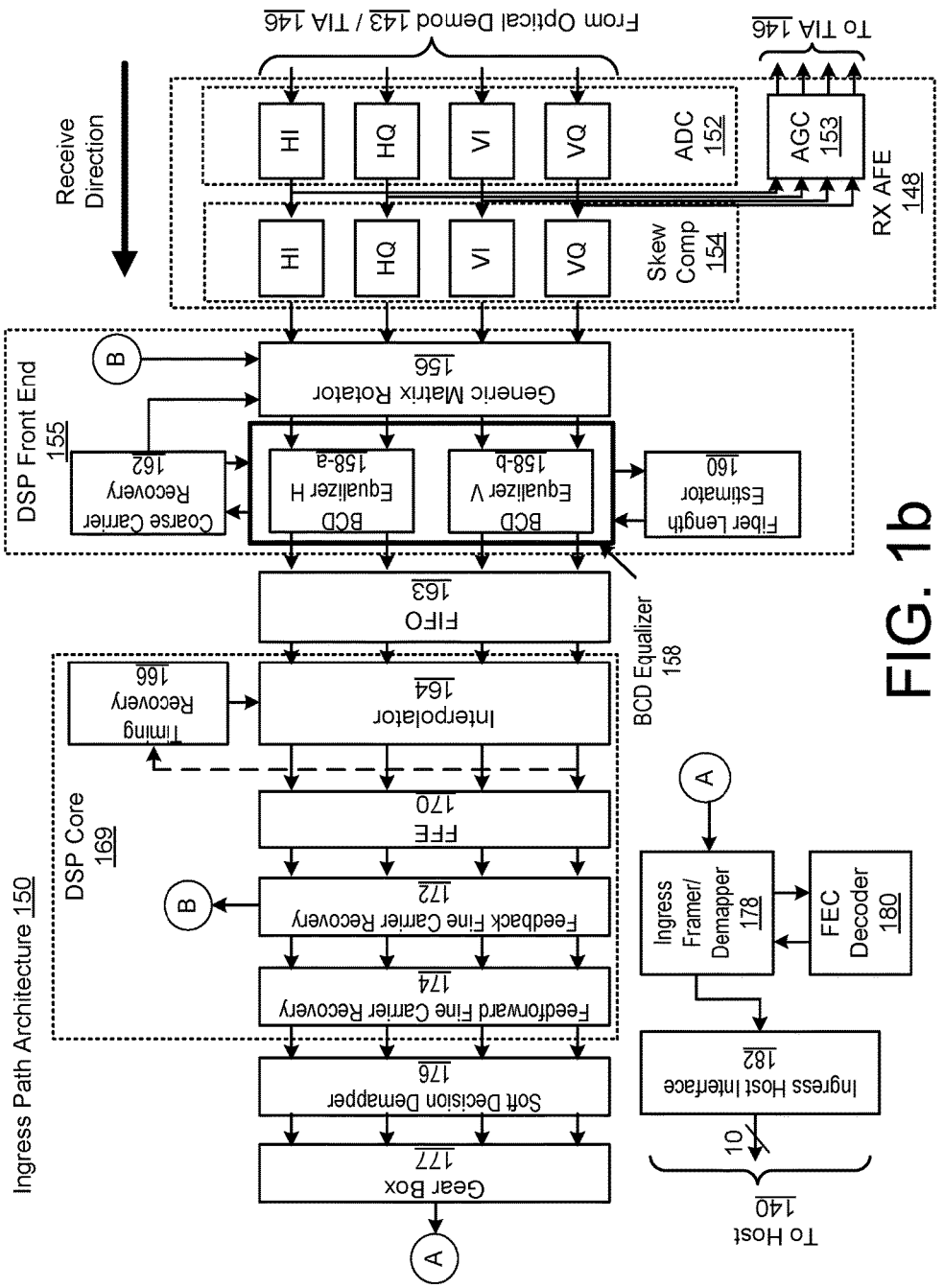

FIGS. 1a-1b include block diagrams illustrating an embodiment of a coherent transceiver including an egress (e.g., transmit) path (FIG. 1a) and a coherent transceiver ingress (e.g., receive) path (FIG. 1b).

Figure 8:
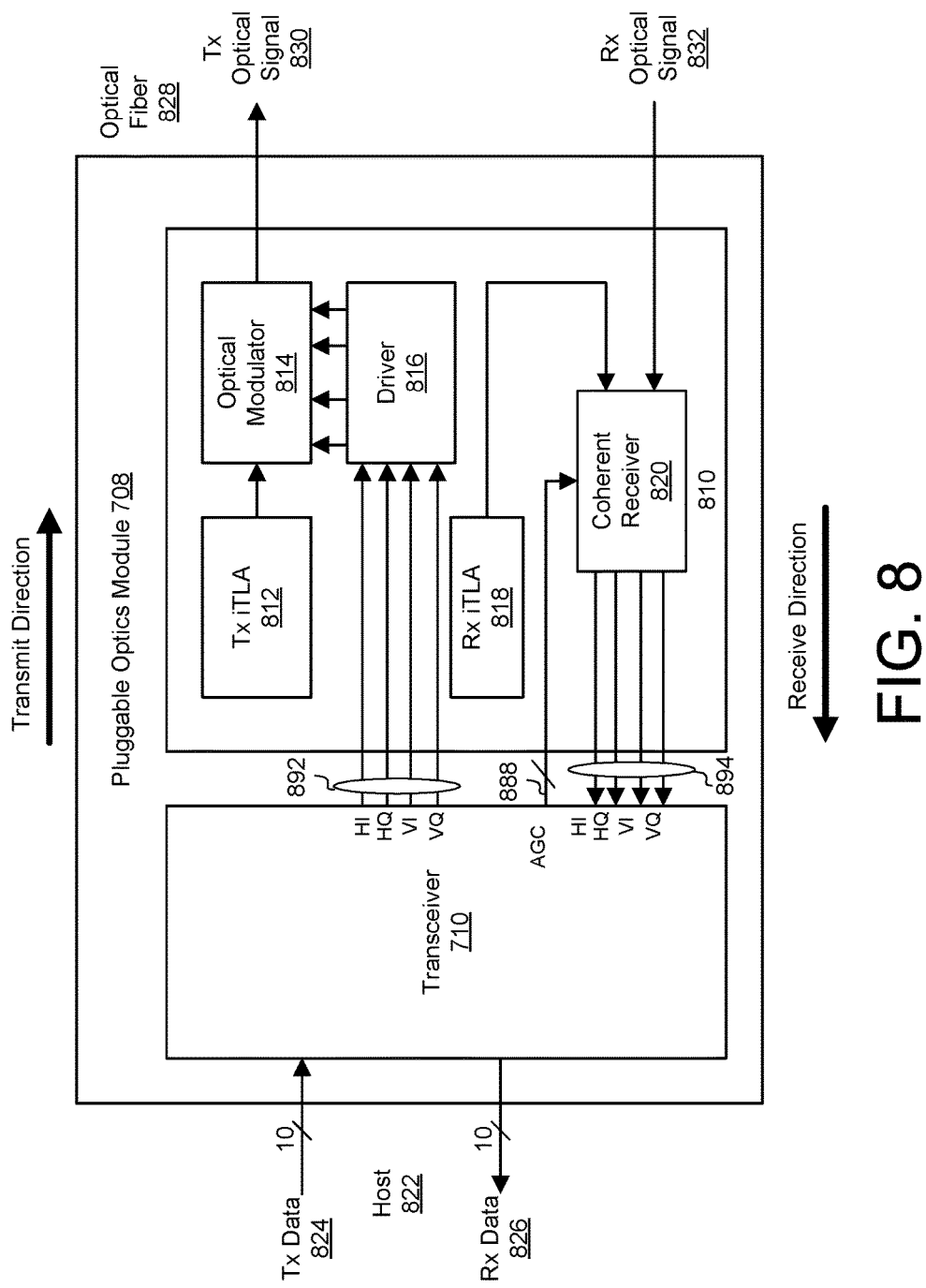
FIG. 8 includes a block diagram of a pluggable optical module for optical communication, in accordance with some embodiments.

In some embodiments, the transceiver is included within a pluggable optical module (see, FIG. 8 discussed below). In other embodiments, it is directly integrated into a line card in a transmission system. Along the transmit or egress direction, the transceiver receives transmit (Tx) data (e.g., a digital electrical signal) from a host, processes the data, and generates a transmit (Tx) optical signal for transmission over an optical fiber (as shown in FIG. 8). Additionally, along the ingress or receive direction, the transceiver receives a receive (Rx) optical signal from the optical fiber, mixes the received optical signal with a local oscillator laser source, processes the signal, and generates receive (Rx) data (e.g., a digital electrical signal) for transmission to the host; the receiving function is typically accomplished using an Integrated Coherent Receiver, which is a widely available optical component.

The transceiver may be programmable for compatibility with host signals conforming to various standards such as, 100 GE (100 Gigabit-per-second Ethernet), OTU4, OTU3, or other standards, and the host interface can be configured appropriately. For example, in one application mode, the transceiver includes a CAUI interface that enables it to communicate directly with a 100 GE port on an Ethernet switch. Alternatively, the interface can be configured to support OTL3.4 for OTU3 or OTL4.10 to support OTU4. Furthermore, the transceiver may be programmable for compatibility with host signals with various data rates, error correction schemes, and so on. The transceiver has internal mapping and framing capability to translate the host interface protocol (for example, 100 GE) to the optical transmission protocol (for example, OTU4). The programmability of the transceiver allows for compatibility with a wide variety of host architectures that can be used in different types of optical networks.

Along the transmit or egress path, the transceiver modulates Tx data received from the host onto a signal vector (e.g., four signal components) representing quadrature (I and Q) components for each of horizontal (H) and vertical (V) polarizations. These components of the signal vector are represented as HI, HQ, VI, and VQ. Along the receive or ingress path, the transceiver receives a signal vector (e.g., four signal components) represented as HI, HQ, VI, VQ from the coherent receiver and performs signal processing functions such as, equalization, timing recovery, and/or demodulation in order to generate Rx data. In one embodiment, the transceiver may furthermore perform additional framing and error correction functions which may adjust the line rate from that used by the host.

Coherent Transceiver Egress Path

FIG. 1a illustrates egress path architecture 101 of a coherent transceiver, in accordance with some embodiments. In an egress or transmit direction, the transceiver receives digital data signals from a host 140 and processes the received data to provide analog output signals suitable for conversion to optical output signals for transmission over an optical network (e.g., via optical modulator 142).

Egress host interface 102 receives a plurality of digital signals from the host 140. Egress host interface 102 optionally includes a host demultiplexer which recovers clock signals from, and demultiplexes, the received data signals. The host demultiplexer may also perform various processing functions such as, for example, equalization, signal integrity monitoring and skew compensation. The host demultiplexer may be programmable to operate in accordance with a number of different interfacing standards such as, for example, CAUI (for 100 GE data), OTL4.10 (for OTU4 data), OTL3.4 (for OTU3 data), and other communication protocols.

Egress Framer/Mapper 104 receives the demultiplexed data from the egress host interface 102 and performs framing/mapping of the data according to a programmable framing/mapping protocol. In other words, egress framer/mapper 104 performs frame synchronization or framing so as to identify or detect frame alignment portions of the received data signals (e.g., distinctive bit sequences or syncwords), thereby permitting the data bits within a received data frame to be extracted for decoding. In one embodiment, egress framer/mapper 104 inserts pilot tones into the frames; pilot tones are used to detect and correct cycle slips, which are an integer multiple of $\pi/2$ phase jumps in a QPSK or QAM constellation. Cycle slip correction is described in references such as: S. Zhang et al., "Pilot-assisted decision-aided maximum-likelihood phase estimation in coherent optical phase-modulated systems with nonlinear phase noise," Photonics Technology Letters, IEEE, vol. 22, no. 6, pp. 380-382, March 2010; X. Wu et al., "Iterative carrier recovery in turbo receivers with distributed pilots," in Consumer Electronics, Communications and Networks (CECNet), 2011 International Conference on, April 2011, pp. 5024-5026; H. Zhang et al., "Cycle slip mitigation in POLMUX-QPSK modulation," in Optical Fiber Communication Conference and Exposition (OFC/NFOEC), 2011 and the National Fiber Optic Engineers Conference, March 2011, pp. 1-3.

In one embodiment, the egress framer/mapper 104 terminates the existing forward error correction (FEC) used by the host 140 (e.g., standard G.709 FEC or other error correction code scheme), by detecting and correcting errors, and stripping off error correction bytes that may be present in the data signals when used with certain host board architectures. In one embodiment, the Egress Framer/Mapper 104 maps 100 GE data received over a CAUI interface into OTU4 frames using the G.709 standard.

FEC Encoder 106 adds error correction bytes according to a forward error correction (FEC) scheme suitable for a particular optical network. In various programmable modes, encoder 106 may be configured as, for example, a standard G.709 FEC encoder (e.g., 6 dB coding gain, 7% overhead GFEC), a soft-decision (SD) FEC encoder (e.g., 11.3 dB coding gain, 20% overhead, low density parity check SD FEC), a hard-decision (HD) FEC encoder (e.g., 8 dB coding gain, 7% overhead HD FEC) or other encoder type. Accordingly, FEC Encoder 106 receives a data stream from Egress Framer/Mapper 104, encodes the data stream, and returns the encoded data stream to the Egress Framer/Mapper 104. In one embodiment, the data stream received by the FEC encoder 106 is already encoded with an existing FEC scheme used by the host 140. In this case, FEC Encoder 106 terminates the existing FEC (e.g., ITU G.709 GFEC), applies a new FEC encoding, and returns signal stream to Egress Framer/Mapper 104. In another embodiment, when the received data stream is not encoded with an existing FEC, FEC Encoder 106 applies (e.g., a new) FEC encoding, and returns the encoded signal stream to Egress Framer/Mapper 104. For example, the new FEC encoding may comprise an SD-FEC based on Low Density Parity Check Codes.

Differential Encoder and Constellation Mapper 108 receives the four input signal streams (e.g., HI, HQ, VI, and VQ) and generates output signals using dual-polarization (DP) differential or non-differential modulation formats, (e.g., PSK, BPSK, QPSK, 16QAM, QAM of other indices, and the like). This may be performed on a per-polarization basis (e.g., separately for each of the horizontal and vertical polarizations using mappers 108-a and 108-b respectively), or using a mapping procedure that mixes polarizations.

Gear Box 109 receives the signal stream from the Differential Encoder and Constellation Mapper 108 at a net data rate corresponding to a nominal data rate. Gear Box 109 reformats the data in the signal stream to a new data rate to accommodate any modifications to FEC codewords, and generates an output signal stream comprising data at the nominal data rate (e.g., at the same data rate as that of the input stream to Gear Box 109). The Gear Box 109 changes the parallelization factor of the Egress Path. In one embodiment, the parallelization factor at the input of the Gear Box 109 is 80, and at its output it is 64. The purpose of changing the parallelization factor at this point is to simplify the architecture of the Spectral Shaping and Preemphasis Filter 111 and of the Interpolator 112 by using a parallelization factor that is consistent with that used by the TX AFE 120. In one embodiment the DSP Core 110 generates two samples of transmitted signal per baud, resulting in signal blocks of 128 samples per clock period for each one of the four lanes HI, HQ, VI and VQ. The DSP Core clock frequency is 500 MHz, therefore the total throughput is 64 GHz. The TX AFE uses 32:1 analog multiplexers at the input of each one of its four interleaves to increase the sampling rate from 500 MHz to 16 GHz. Therefore, each interleave of the TX AFE 120 operates at a sampling rate of 16 GHz, resulting in an aggregate sampling rate of 64 GHz for the four interleaves. The main reason to use a parallelization factor of 64 is to simplify the design of the analog multiplexers by using a multiplexing factor that is a power of two.

Digital Signal Processor (DSP) core 110 encompasses four spectral shaping and preemphasis filters 111, one for each lane HI, HQ, VI and VQ. In one embodiment, the spectral shaping filters have a user-programmable response, which is typically programmed to a square-root raised cosine response with an excess bandwidth between 10% and 50%. Furthermore, the spectral shaping response may be combined with a preemphasis response that pre-compensates for frequency-dependent attenuation typically present in the signal path in the electrical channel.

For example, the spectral shaping and preemphasis filter 111 is designed to have a frequency response that pre-compensates for, or pre-equalizes, frequency-dependent attenuation of the electrical path between the DAC and the optical modulator. In some embodiments, each of the four signal components (HI, HQ, VI, VQ) of the received data signal is processed individually and separately. In some embodiments, the response of the filter 111 is computed using an on-chip microprocessor that calculates the convolution of the root-raised cosine filter and the preemphasis filter 111.

In one embodiment, spectral shaping is used to limit the bandwidth of the transmitted optical signal. This is important because it enables a denser packing of optical channels (wavelengths). It is also important to limit the bandwidth of the optical signal in a way that does not introduce additional intersymbol interference. In one embodiment, spectral shaping is done using square root raised cosine filters with one filter per channel (HI, HQ, VI, VQ). In one embodiment, the combination of two square root raised cosine filters, one at the transmitter and another at the receiver results in a raised cosine combined response, which has zero intersymbol interference. In one embodiment the spectral shaping filters are user-programmable, so responses other that square root raised cosine are possible. For example, in one embodiment, spectral shaping filters are square root raised cosine filters with a programmable excess bandwidth between 10% and 50%.

Bandwidth limitation via spectral shaping filters is applied both at the transmitter and at the receiver. Spectral shaping at the transmitter prevents the transmitted signal from interfering with adjacent channels, therefore enabling dense packing of wavelengths. In a reciprocal way, bandwidth limitation at the receiver results in rejection of adjacent channels, also enabling denser packing of wavelengths. Although bandwidth limitation both at the transmitter and at the receiver is possible using optical filters, the use of electrical filtering in the transceiver is more cost effective.

Pre-equalization is used to compensate for the frequency-dependent attenuation of the electrical channel between the transceiver and the optical modulator. The pre-equalization response is combined with the spectral shaping response and the combined response is programmed on Spectral Shaping and Preemphasis Filter 111. This filter 111 collectively precompensates for the frequency-dependent attenuation of the electrical path between the DAC and the optical modulator. For example, in one embodiment, the filter 111 has a polyphase structure (2 phases, output sampled at T/2), length 40 taps, stopband attenuation>=40 dB.

The Interpolator 112 interpolates the data signal from the DSP core 110 to convert between sampling rates to enable different components of the egress path architecture 101 to operate at different sampling rates. For example, the interpolator 112 may perform a sampling rate conversion so as to interface DSP core 110 with DAC 126 without loss of data samples when the DSP core 110 and the DAC 126 (described below) receive and process data at different sampling rates. Illustrations and details of various structural and operational principles of interpolator 112 and variations in clock and sampling rates are described further with reference to FIGS. 2a-2b below.

FIFO 114 comprises a data storage buffer that stores and queues blocks of data samples received in parallel from the interpolator 112. FIFO 114 feeds the data samples to the transmit analog front end (TX AFE) 120.

TX AFE 120 comprises Skew Compensation Filter 122 and DAC 126, one each for the four (HI, HQ, VI, VQ) signal vector lanes. TX AFE 120 generates analog signals to be output to optical modulator 142. Skew Compensation Filter 122 includes digital interpolation filters to compensate the skew introduced by the optical demodulator and the electrical signal path between the 4 lanes. The Digital-to-analog converter 126 receives the 4-channel signal vectors, and generates analog signals (HI, HQ, VI, VQ) for transmission to the optical modulator 142. As a result of the presence of the spectral shaping and preemphasis filter 111, the signal at the input of the DAC is approximately continuous in spite of the fact that the BPSK, QPSK or QAM transmitted symbols have discrete levels. In practice the DAC input signal is not exactly continuous, but it is quantized to a relatively high resolution, for example 8 bits. The DAC 126 accepts these high resolution signals and converts them to an analog representation. The DAC 126 may operate according to different programmable sample rates in different application modes (e.g., 32 GSa/s for DP-16QAM, 64 GSa/s for DP-QPSK, at 128 Gb/s line rate where GSa/s refers to giga-samples per second. Here, DP means dual polarization.)

In one embodiment, the Skew Compensation Filter 122 is omitted as an independent component of the TX AFE 120 and skew compensation is instead achieved via the spectral shaping & preemphasis filter 111 and parameters of the DAC 126.

Coherent Transceiver Ingress Path

FIG. 1b illustrates the ingress path architecture 150 of a coherent transceiver, in accordance with some embodiments. In an ingress or receive direction, the transceiver receives analog input signals (e.g., converted from optical signals received over the optical network) from optical demodulator 143 or from a transimpedance amplifier (TIA) 146 within optical demodulator 143, at the receive analog front end (RX AFE) 148. Components of the ingress path architecture 150 process the received analog input signals to generate the digital data signals for transmission to the host 140. RX AFE 148 comprises Analog to Digital Converter (ADC) 152, and optionally comprises Automatic Gain Control (AGC) 153 and Skew Compensation filters 154.

In some embodiments, ADC 152 converts the received analog signals (HI, HQ, VI, VQ) to corresponding digital signal vectors. The ADC 152 may be programmable to operate with different resolutions and/or different programmable data rates (e.g., 32 GSa/s for DP-16QAM, 64 GSa/s for DP-QPSK, at 128 Gb/s line rate).

Automatic Gain Control (AGC) 153 detects the strength of the received analog signals (via their digital vector representations) and generates feedback signals to control gains of the transimpedance amplifiers (TIAs) (which generally reside in the optical demodulator) that receive and amplify the received optical signals from the optical network. In one embodiment, received signal strength is measured in terms of the average absolute value (roughly equivalent to rms value) of the received signal. The peak value of the received signal depends on the amount of chromatic dispersion introduced by the fiber. Large values of chromatic dispersion result in an increase in peak to average ratio of the received signal.

In some embodiments, AGC 153 drives a peak to average value of the received analog signals to a target set point based on a value of fiber length estimated by the Fiber Length Estimator 160 via a feedback signal (not shown). A lookup table determines the target value of the AGC feedback signals based on the peak to average ratio estimates provided by the FLE. In an alternate embodiment, the lookup table determines the target average signal values after amplification by the gain-controlled TIAs. The HI, HQ, VI and VQ channels are independently controlled. The AGC outputs are converted to analog by 4×10 MHz-10-bit DACs and are used to control the gain of the transimpedance amplifiers (TIAs). In one embodiment, the HI, HQ, VI and VQ channels may be independently controlled. In another embodiment, they are controlled together. In yet another embodiment, the AGC feedback signals may control gains of variable gain amplifiers included in the receiver ASIC instead of controlling gains of the TIAs. In an alternate embodiment, the AGC feedback signals may be digital words instead of analog signals.

Skew compensation filters 154 compensate for differential delays among the four lanes introduced by the electrical signal path, as well as skews of the demodulator 143. In some embodiments, skew adjustment is accomplished using phase interpolators to add variable delay. In one embodiment, skew compensation is in the range +/−2.8 UI, where UI means Unit Interval of a symbol. Skew compensation may be performed with an objective to minimize the bit error rate (BER).

Signal vectors from the RX AFE 148 are output to DSP front end 155. DSP front end 155 comprises Generic matrix rotator 156, BCD Equalizer 158, Fiber Length Estimator 160, and Coarse Carrier Recovery (CCR) 162.

Generic matrix rotator 156 applies an arbitrary 4×4 matrix transformation to the 4-dimensional input vector to compensate for impairments of the optical demodulator 143. Matrix rotator 156 applies a linear transformation to the input signal vector, which can be described by the following equation:

$$\begin{bmatrix} HI_{OUT} \\ HQ_{OUT} \\ VI_{OUT} \\ VQ_{OUT} \end{bmatrix} = \begin{bmatrix} F_{00} & F_{01} & F_{02} & F_{03} \\ F_{10} & F_{11} & F_{12} & F_{13} \\ F_{20} & F_{21} & F_{22} & F_{23} \\ F_{30} & F_{31} & F_{32} & F_{33} \end{bmatrix} \begin{bmatrix} HI_{IN} \\ HQ_{IN} \\ VI_{IN} \\ VQ_{IN} \end{bmatrix} \quad (1)$$

where the 4-dimensional vectors represent the four components of the signal at the input and the output of the matrix rotator 156.

BCD Equalizer 158 (including BCD Equalizer H 158-a and BCD Equalizer V 158-b) includes a long finite impulse response filter that is used to filter the signal in the frequency domain to compensate for chromatic dispersion in the optical channel. As explained with reference to FIGS. 5a-5b, BCD Equalizer 158 operates in one of a plurality of modes of operation depending on the amount of chromatic dispersion in the channel, as determined by an estimated amount of chromatic dispersion introduced by the optical channel.

Fiber Length Estimator 160 estimates the extent or amount of chromatic dispersion introduced by the optical channel to select a mode of operation of the BCD Equalizer 158. Accordingly, the Fiber Length Estimator 160 generates a control signal (dependent on the amount of chromatic dispersion) that is used to select the frequency response of the BCD Equalizer 158 to accurately compensate for the chromatic dispersion present in the channel. In one embodiment, Fiber Length Estimator 160 receives data from both BCD Equalizer H 158-*a* and BCD Equalizer V 158-*b*. In another embodiment, Fiber Length Estimator 150 receives data from only one of BCD Equalizer H 158-*a* or BCD Equalizer V 158-*b*.

Coarse Carrier Recovery (CCR) 162 performs an initial frequency acquisition or carrier recovery of the received signal (e.g., during a start-up phase). The CCR 162 can operate in the presence of large frequency offsets. CCR performs an initial frequency acquisition, which facilitates the subsequent acquisition by the fine carrier recovery blocks 172, 174, described below. In some embodiments, frequency offsets of a local oscillator (LO) may be approximately 5 GHz. CCR 162 enables reliable operation of the transceiver in the presence of such LO frequency offsets and is typically used for carrier recovery during a start-up phase of transceiver operation. CCR will typically compensate to an accuracy of 1 GHz or better, and fine carrier recovery (e.g., feedback fine carrier recovery 172, explained below) compensates the balance of the LO offset. In one embodiment, the CCR 172 is based on a Differential Power Measurement (DPM) method. Once in normal operation mode, the frequency estimate provided by the fine carrier recovery blocks 172, 174 discussed below drive the CCR 162. In one embodiment, CCR 172 receives data from both BCD Equalizer H 158-*a* and BCD Equalizer V 158-*b*. In another embodiment, CCR 172 receives data from only one of BCD Equalizer H 158-*a* or BCD Equalizer V 158-*b*. In the latter case, when BCD is not used, e.g. for applications with low dispersion, the unused block can be powered down.

FIFO 163 is a data storage buffer that stores and queues blocks of data samples received from BCD equalizer 158 and feeds these samples to Interpolator 164 in blocks of variable size such that the input to the Interpolator 164 has enough samples to output 2P samples every clock period of the DSP, where the clock frequency of the DSP is the baud rate divided by P, and P is the parallelization factor of the DSP. In one embodiment, the parallelization factor of the DSP is 80, and therefore the size of the block passed by the FIFO 163 to the Interpolator 164 is sufficient to generate 160 samples after interpolation. In one embodiment, the block size that feeds Interpolator 164 is close to 140 but it could be a few samples larger or smaller than this number depending on the relationship between the frequency of the Line Ingress PLL 222 (which is ¼ the sampling rate in one embodiment) and the symbol frequency of the received signal. This block size may vary from clock period to clock period of the receiver. Further details of this example embodiment are as follows. Consider an ADC sampling frequency of 56 GSa/s and a baud rate of 32 Gbaud. The BCD equalizer 158 passes blocks of length 128 to the input of the FIFO 163 at a rate of 56 GHz/128=437.5 MHz. The FIFO outputs blocks of 140 samples at the DSP clock rate of 400 MHz, which is equal to the baud rate (32 GHz) divided by P, where P is 80 in this example. Note that the FIFO output block length is the ratio between the sampling frequency (56 GHz) and the DSP clock rate (400 MHz). The Interpolator 164 interpolates the samples such that it outputs a block of 2P (160) samples at the DSP clock rate of 400 MHz.

The DSP core 169 comprises an interpolator 164, a timing recovery block 166, a feedforward equalizer (FFE) 170, a feedback fine carrier recovery block 172, and a feedforward fine carrier recovery block 174.

The Interpolator 164 interpolates the data signal from the FIFO 163 to convert between sampling rates to enable different components of the ingress path architecture 150 to operate at different sampling rates. As described above with reference to interpolator 112, the ingress path architecture 150 of the transceiver also supports multiple baud rates, sampling rates, and clock rates. Different baud rates are supported in different modes of operation or on different channels. In some embodiments, the baud rate does not change across the Ingress Path or across the Egress Path, although it may be different for Ingress and Egress. For example, the DSP core 169 and the ADC 152 may operate at different sampling rates and clock rates. Interpolator 164 performs the sampling rate conversion to interface between the DSP core and the ADC data rates without any loss of data samples. Additional details on the structure and functionality of interpolator 164 are described with reference to FIGS. 3*a*-3*c* below.

Timing Recovery block 166 generates a clock signal synchronized to the phase and symbol frequency of the received signal. The symbol frequency and phase of the received signal are controlled by a clock at the transmitter and are estimated at the receiver to recover the transmitted symbols. In one embodiment, Timing Recovery block 166 compensates for symbol frequency errors of approximately +/−200 ppm or better, and tracks jitter in the received signal. In some embodiments Timing Recovery 166 incorporates a Rotational Frequency Detector, which increases its capture range, for example beyond +/−200 ppm, to +/−1000 ppm.

FFE 170 filters the data in order to apply an equalization that compensates for intersymbol interference (ISI) effects imposed by the optical and electrical channels. In particular, the ISI may be caused by: residual chromatic dispersion that is not compensated by the BCD Equalizer 158 (e.g., because the BCD Equalizer 158 is bypassed or because its adaptation to the chromatic dispersion in the fiber is not adequately precise), polarization mode dispersion, and bandwidth effects caused by the electrical channel (including connectors). The FFE 170 also separates the two components of the polarization of the received signal, which in general have been mixed in an intricate way by the polarization mode dispersion (PMD) of the optical channel and by the random rotations of the state of polarization of the transmit laser and the local oscillator. In different programmable modes, the FFE 170 may apply a filter having, for example, 4 taps, 8 taps, 12 taps, 16 taps, 20 taps, 24 taps, or some other filter length. In the case where the FFE 170 is programmed to use less than its total number of taps, the unused taps may be shut down or clock gated to save power. In other words, the FFE 170 performs the polarization demultiplexing and compensates for Polarization Mode Dispersion (PMD) and for any residual CD not compensated by the BCD Equalizer 158. FFE 170 optionally tracks nonstationary effects such as polarization rotation and dynamic PMD changes (such as fast tracking speed of nonstationary effects, which are particularly important to track and compensate for).

Feedback fine carrier recovery 172 and Feedforward fine carrier recovery 174 operate to further refine the carrier recovery performed by the Coarse Carrier 162 once in normal operation. The fine carrier recovery blocks 172 and 174 receive samples from the FFE 170 and apply a phase domain, decision directed phase locked loop (PLL) to estimate and compensate for the frequency and phase differences between the transmitted signal carrier (after propagation through the fiber) and the local oscillator.

The fine carrier recovery blocks 172 and 174 further apply a phase noise estimation algorithm to compensate for phase noise in the samples, which may be caused by, for example, nonzero laser linewidth in the transmit laser and/or local oscillator, or by fiber nonlinearities. Finally, the fine carrier recovery blocks 172, 174 slice the frequency/phase compensated samples and provides tentative decisions and the slicer error to the LMS adaptation of the FFE 170. Because the residual carrier rotation of the received signal (after the optical demodulation and partial frequency offset compensation by the Coarse Carrier Recovery 162) has been removed by the Fine Carrier Recovery blocks 172 and 174, the tentative decisions and the slicer error are re-rotated, in order to operate properly in the LMS adaptation of the FFE. In some embodiments, the phase noise estimation in the feedforward fine carrier recovery block 174 uses either a Viterbi-Viterbi carrier recovery (VV-CR) algorithm or blind phase search (BPS-CR) algorithm. Feedforward fine carrier recovery block, 174 may be configured to provide either VV-CR or BPS-CR algorithms and to select from among the two algorithms depending on the application mode of the transceiver. The Fine Carrier Recovery block 174 also passes the carrier-compensated signal samples to the symbol de-mapper 176.

Soft/hard decision demapper 176 decodes the received constellation data and provides the soft-information (i.e. the log-likelihood ratio of the bits) or hard-information (i.e. bits) as the input to a downstream Forward Error Correction (FEC) code. Soft/hard decision demapper 176 computes soft and hard decisions to pass to the FEC Decoder 180, through intermediate functions internal to the Ingress Framer/Demapper 178, such as the Line Framer 280 (shown in FIG. 2b) and the Gearbox 177. The FEC Decoder 180 uses the soft decisions when it operates in soft decision mode or it uses the hard decisions when it operates in hard decision mode. In one embodiment, the soft decision FEC decoded by FEC Decoder 180 is an LDPC code. In the hard decision mode, the soft/hard decision demapper computes the most probable transmitted bits based on the received symbols. In the soft decision mode, for each received bit, the soft decision is computed as the logarithm of the ratio of the likelihood of the bit being a zero over the likelihood of the bit being a one. This ratio is usually called "the log-likelihood ratio." In one embodiment, soft/hard decision demapper 176 also corrects for cycle slips by examining pilot tones in the received frames, where pilot tones have been inserted by the Egress transmitter.

Gear Box 177 changes the parallelization factor of the signal in the ingress path in a manner similar to that of the Gear Box 190 in the egress path, described above.

Ingress framer/de-mapper 178 performs framing/de-mapping of the data according to a programmable framing/mapping protocol, so as to transform the modulation symbols in the received modulated signal to the source bits at the ingress path.

FEC Decoder 180 optionally receives data stream from Ingress Framer/Demapper 178. In one embodiment, FEC Decoder 180 terminates existing FEC, and subsequently returns signal stream to Ingress Framer/Demapper 178, which adds error correction using an FEC scheme that corresponds to the error correction scheme used by the host 140 (e.g., standard G.709 FEC or other error correction code scheme). In another embodiment, FEC Decoder 180 terminates existing FEC, and subsequently returns signal stream to Ingress Framer/Demapper 178, which does not encode data stream with new FEC. In one embodiment, Ingress framer/de-mapper 178 demaps 100 GE from and OTU4 signal using the G.709 standard.

Egress host interface 182 optionally includes a host multiplexer that multiplexes the data according to the communication protocol used by the host 140. In different modes, the multiplexer may be programmable to operate in accordance with a number of different interfacing standards such as, for example, CAUI (for 100 GE data), OTL4.10 (for OTU4 data), OTL3.4 (for OTU3 data), and other communication protocols.

In one embodiment, the transceiver of FIGS. 1a-1b is implemented as an application specific integrated circuit (ASIC). Furthermore, portions of the transceiver (e.g., the functional blocks of the digital signal processor) may be implemented as a processor and a non-transitory computer-readable storage medium that stores computer-executable instructions. During operation, the processor loads and executes the instructions to carry out the functions described herein. Other functional blocks of the transceiver may be implemented in hardware, firmware, or a combination of software, hardware, and/or firmware.

In an alternative embodiment, the egress path of the transceiver described above (and relevant management blocks) may be implemented as a standalone transmitter that does not necessarily have a receiver integrated in the same device. Furthermore, in another alternative embodiment, the ingress path of the transceiver described above (and relevant management blocks) may be implemented as a standalone receiver that does not necessarily have a transmitter integrated in the same device.

Timing, Clock Routing, and Sampling Rate Conversions

Figure 2A:
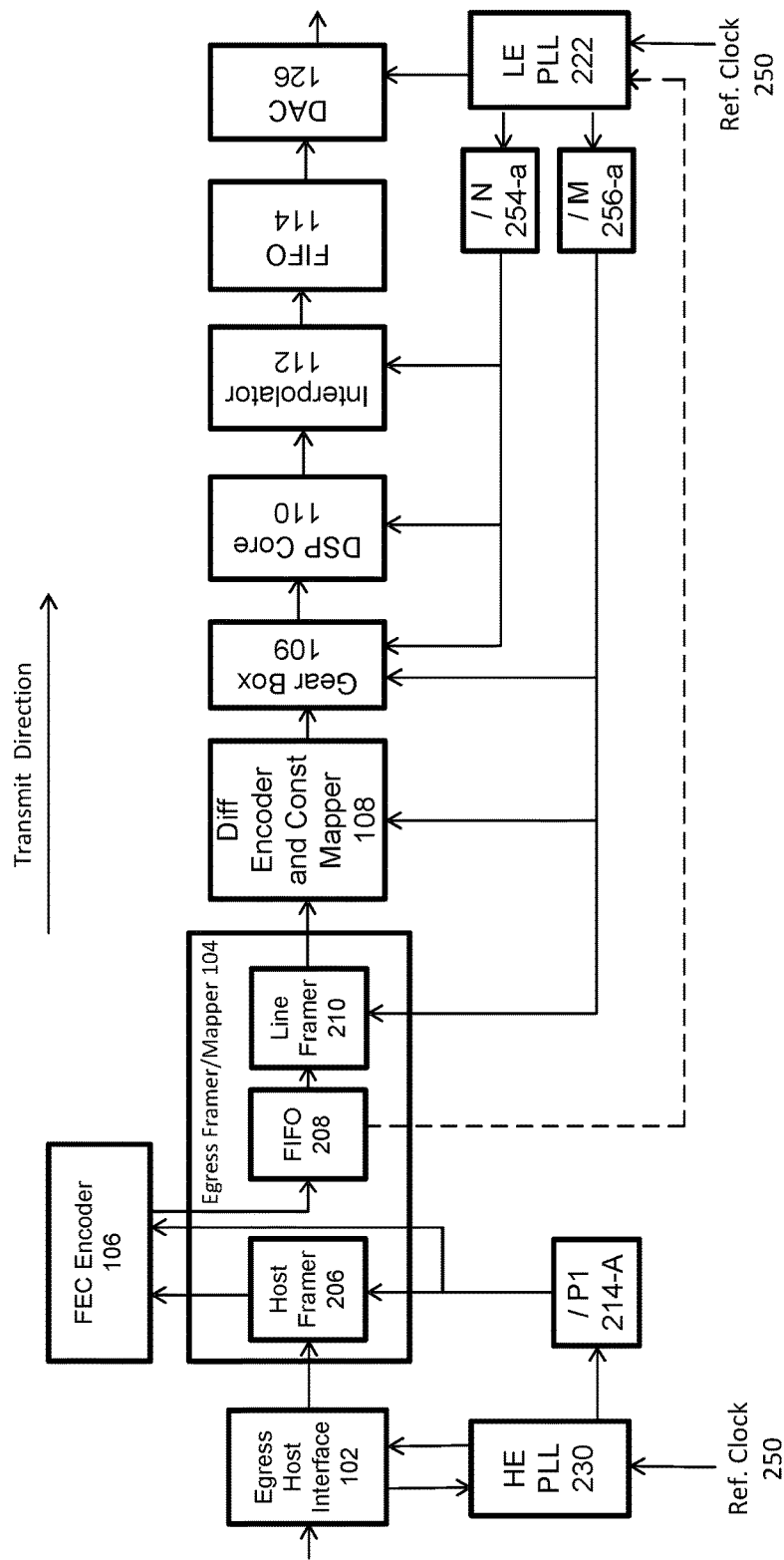
FIGS. 2a-2b include block diagrams illustrating clock routing circuitry for providing clock and timing signals to one or more components of the transceiver egress path (FIG. 2a) and ingress path (FIG. 2b), in accordance with some embodiments.
Figure 2B:
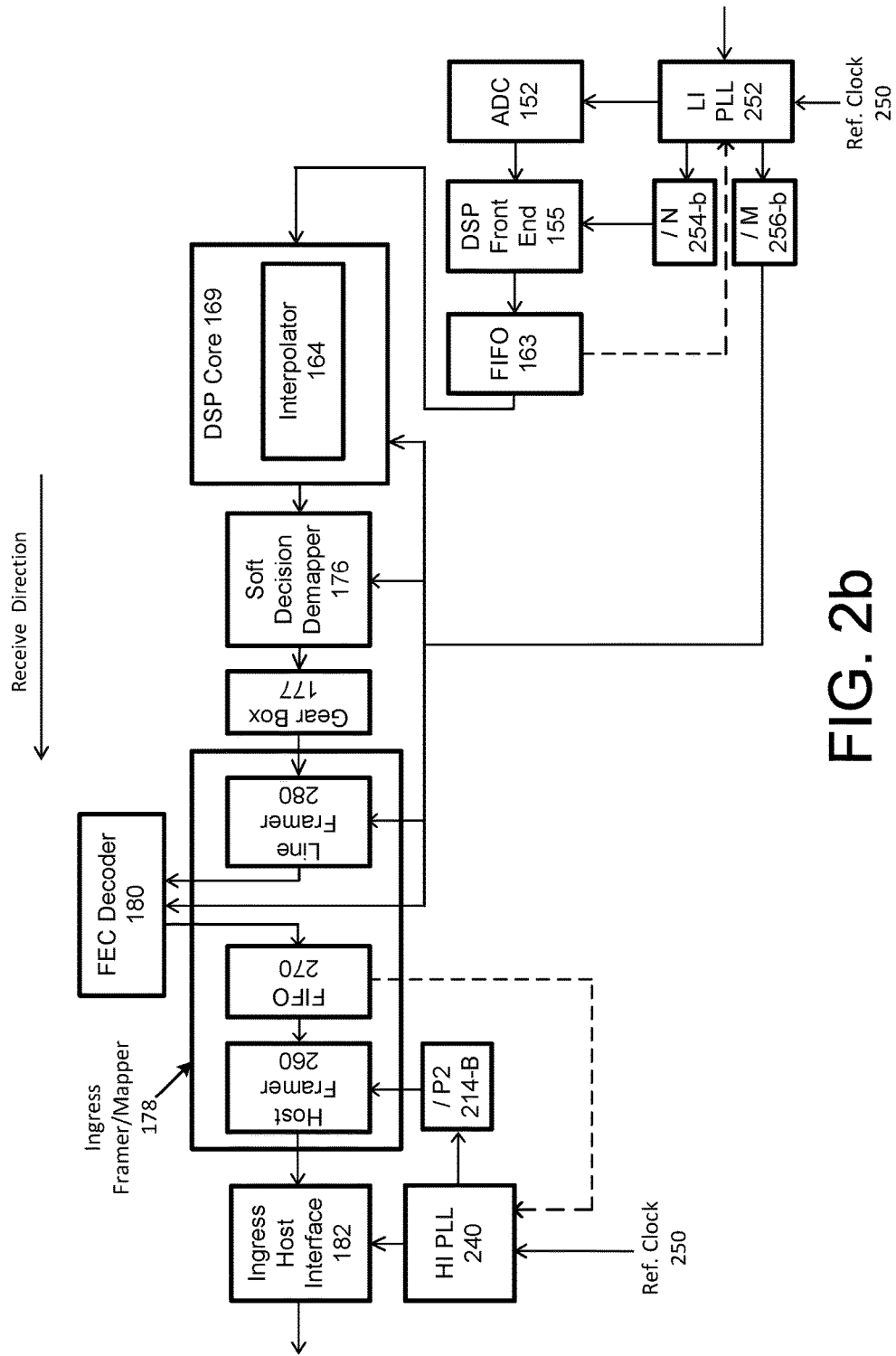
Figure 3C:
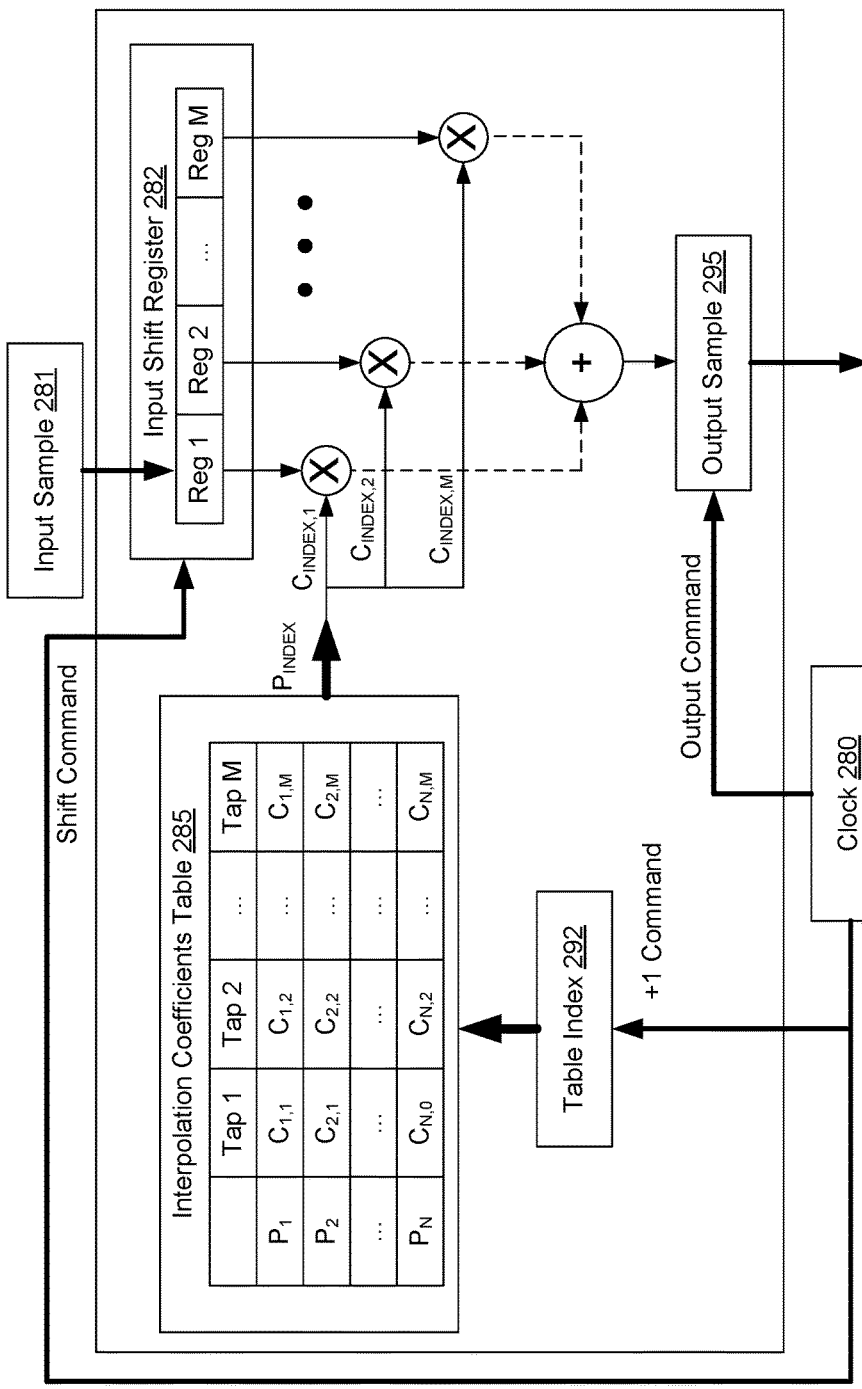

FIGS. 2a-2b include block diagrams illustrating clock routing circuitry for providing clock and timing signals to one or more components of the transceiver egress path (FIG. 2a) and ingress path (FIG. 2b), in accordance with some embodiments. FIGS. 3c-3e illustrate additional details of the timing recovery block 166 and interpolator filter 164.

The egress path (see, FIG. 2a) and the ingress path (see, FIG. 2b) of the transceiver are both characterized by a line-side interface that is coupled with the optical channel and a host-side interface that is coupled with the host. Generally, the line-side interfaces operate internally at clock frequencies of approximately 500 MHz (e.g., approximately at Fs/128, where Fs is the sampling rate) and the host-side interfaces operate at approximately 700 MHz (e.g., at $\frac{1}{16}$ of the host baud rate).

Although each of the line-side and host-side interfaces of the egress and ingress paths receive clock signals from their respective phase locked loops (PLLs), resulting in four distinct phase locked loops (Host Egress PLL 230, Line Egress PLL 222; Host Ingress PLL 240, and Line Ingress PLL 252), a single reference clock (Ref Clock 250) is used for all four PLLs.

As explained above, the transceiver (along the egress and ingress paths) supports multiple (and optionally, variable) baud rates (e.g., data rates), sampling rates, and clock rates. In other words, two components of the transceiver may receive, process and output data at different sampling rates; for example, the DSP core 110 and the DAC 126 receive and process data at different sampling rates. Furthermore, the DSP core 110 is capable of operating in various configuration modes characterized by several different baud rates. In some embodiments, interpolation-based interfaces (e.g., interpolative finite impulse response filters) provide capability to transition from one sampling rate to another without loss of data, and to interface components along the transceiver path that operate on different clock frequencies. For instance, the line ingress PLL 252 and the line egress PLL 222 operate based on respective predefined clock frequencies. The DAC 126 along the egress path also operates on a predefined fixed clock frequency (e.g., at 64 GHz), as do the preemphasis filters 111. However, the DSP core 169 functions in a variety of modes of operation that, in turn, use different clock frequencies. Interpolators 112, 164 performs sampling rate conversions so as to interface various components along the transceiver egress path (e.g., DSP core 110 with DAC 126) or the transceiver ingress path (e.g., DSP core 169 with ADC 152) respectively without loss of data samples.

A ratio or relationship between the clock rates for data input to and output from the FIFO buffers may be unknown (e.g., in the Line Egress path), or may not be convenient ratios to work with mathematically (e.g., in the case of the FEC blocks along the Line Ingress path). To ensure that the FIFO buffers do not overflow, a feedback signal based on, for example, a buffer fill level is used to adjust either the input or output clock rate for data input to or output from FIFO buffers (illustrated with dotted lines in FIGS. 2a-2b). Dotted lines with arrows show the sense point and actuation point for these feedback signals. Ways to avoid FIFO overflow vary based on architecture. One way is to make the entire ingress path synchronous by controlling the sampling rate of the ADC based on Timing Recovery. In this case there is a single clock and a single sampling rate for the entire ingress path. This would eliminate the need for data buffers or FIFOs along the ingress path, thereby eliminating the need to control buffer overflow. Another way to avoid FIFO overflow may be to control the sampling clock of the DSP core independently of the sampling rate of the DSP Front End (DFE). In such cases, the clock division factor (e.g., M 256 shown in FIGS. 2a-2b) may be dynamically adjusted. FIG. 2a illustrates clock routing along the egress path, illustrating a single reference clock providing timing reference to one or more clock domains of the egress path. Accordingly, FIG. 2a includes a block diagram illustrating clock routing and interpolation along the transceiver egress path, according to some embodiments.

The egress path architecture 101 of the transceiver includes a plurality of clock domains. For example, in the architecture shown in FIG. 2a, the egress path comprises three clock domains—one each for the DAC 126, the DSP core 110, and the host interface elements. Various components or elements in the various clock domains along the egress path operate on (e.g., receive, process and output) data at various different sampling rates, and clock rates.

As shown in FIG. 2a, the Host Egress PLL (HE PLL) 230 receives reference clock (Ref Clock 250), and generates a fractionally-multiplied clock as a reference for the Egress Host Interface 102. In some embodiments, the frequency of the generated clock is adjusted by feedback from the data received from the host to match the input data frequency. The signals and clocks transition from the Egress Host Interface 102 to host framer 206 of the Egress Framer/Mapper 104; a fixed divide-by-P1 214-a (e.g., P1=16) generates a clock signal used by the Egress Framer/Mapper 104 and FEC Encoder 106. FIFO (or gear-shift) 208 transfers data to the Egress DSP core 110 clock domain, which is synchronous to the DAC sampling clock domain, and related to the DAC 126 sampling rate ($F_{S,DAC}$) by an integer in the range [12-48]. This variable ratio allows the baud rate at DSP core 110 to vary independent of a tuning range of the LE PLL 222. And finally, the signals transition to the clock domain of DAC 126 which receives the clock signal directly from the Line Egress PLL (LE PLL) 222. The Egress DSP core 110 is synchronized with the DAC 126.

The reference clock 250 also drives the Line Egress Phase Locked Loop (LE PLL) 222 which in turn generates a clock signal at a predefined frequency (e.g., 16 GHz). The clock frequency division blocks 254-a and 256-a generate multiple fractional clock frequencies. DAC 126 receives DAC Clock directly from the LE PLL 222 (typically a fixed or predefined clock rate of 16 GHz). The DSP Core 110 operates at a plurality of operational modes characterized by a plurality of baud rates and clock rates. Thus, DSP Core 110 receives DSP clock through a divide-by-N clock frequency division block 254-a which provides multiple fractional clock rates (fractional ratios ranging from 12-48) to generate clock signals ranging from 333-1333 Mz. Interpolator 112 optionally receives a frequency divided clock signal (e.g., at 500 MHz) via the frequency division block 254-a (e.g., providing a fractional ratio of 32), one with several baud rates for DSP Core 110.

FIG. 2a also illustrates details of the Egress Framer/Mapper 104, which consists of the Host Egress Framer 206 and the Line Egress Framer 210. The Host Egress Framer 206 identifies frames in the data received from the Host Interface 102 and terminates the GFEC if present in the data. FEC Encoder 106 determines error correction bytes for the line FEC, and the Line Framer 210 assembles the transmitted frames, adding the line FEC parity bits and other overhead bits and passes the framed data to the Differential Encoder and Constellation Mapper 108. Between Host Egress Framer 206 and Line Egress Framer 210 along the egress signal path, there optionally is FEC Encoder 106 and FIFO 208. FIFO 208 facilitates proper crossing of the boundary between the Host Egress and the Line Egress clock domains, thereby preventing data loss when transitioning between clock domains. In one embodiment, Line Framer 210 provides FIFO 208 signals to control transfer of data to Line Framer 210. The difference between the read and write pointers of FIFO 208 act as a phase error signal (e.g., feedback signal shown by a dotted arrow) to control the Line Egress PLL 222. The line framer 210 and differential Encoder and Constellation Mapper 108 operate from a frequency divided clock signal generated by a divide-by-M frequency division block 256-a which divides a frequency from line egress PLL 222 Gear Box 109 is used to change the parallelization factor of the Egress Path between two different values. In one embodiment the parallelization factor of the blocks located before the Gear Box is 80, and the parallelization factor of the blocks located after the Gear Box is 64.

Since various components in the various clock domains along the egress path operate on (e.g., receive, process and output) data at various different sampling rates, and clock rates, if such components were to be directly interfaced or coupled together, this would result in loss of data owing to sampling rate mismatches. Accordingly, Interpolator 112 is a finite impulse response interpolation filter (as explained further with reference to FIG. 3c) that interfaces between components that operate at different sampling rates (e.g., DSP 110 and DAC 126, as shown in FIG. 2a) and performs a sampling rate conversion so as to enable transfer of samples between DSP 110 with DAC 126 without loss of data samples.

FIG. 2b illustrates clock routing along the transceiver ingress path, illustrating a single reference clock 250 providing timing reference to one or more elements of the ingress path, according to some embodiments. The ingress path architecture 150 of the transceiver similarly includes a plurality of clock domains. For example, in the architecture shown in FIG. 2b, the ingress path comprises three clock domains—one each for the ADC 152, the DSP core 169, and the host interface elements. Various components or elements in the various clock domains along each of the ingress path operate on (e.g., receive, process and output) data at various different sampling rates, and clock rates.

The Line Ingress PLL (LI PLL) 252 generates a fractionally-multiplied clock from the reference clock (Ref Clock 250) to generate a sampling clock for the ADC 152. The signals transition from the ADC 152 to the DSP Front End (DFE) 155, which typically functions at a fixed divide-by-N rate (generated by the /N block 254-b (e.g., N=32) relative to the clock frequency of the LI PLL 252. The divider ratio N in frequency divider 254-b is not necessarily the same as divider ratio N in 254-a of the egress path if the ingress path and egress path are operating in different modes. By virtue of its operation, interpolator 164 retrieves samples from FIFO 163 and generates samples at twice the baud rate corresponding to an interpolative timing recovery (ITR) clock rate. Feedback from FIFO 163 (shown by the dotted line in FIG. 2b) adjusts the fractional ratio of the LI PLL 252 to ensure that a long-term average clock rate of the LI PLL 252 comports with the ITR baud rate. The Ingress DSP core 169 is generally synchronous with ADC 152. The DSP Core 169 operates at a baud rate, which is related to the LI PLL clock rate by a divide-by-M integer divider (e.g., in the range [12-48]) controlled by frequency divider 256-b. This allows the baud rate at DSP Core 169 to vary by an amount independent of the tuning range of the LI PLL 252. The divider ratio M in frequency divider 256-b is not necessarily the same as divider ration M in 256-a of the egress path if the ingress path and egress path are operating in different modes.

The Host Ingress PLL (HI PLL) 240 is controlled by FIFO 270 inside Ingress Framer/Mapper 178, and generates a fractionally-multiplied clock for Host Ingress Interface 182. The HI Framer/Mapper 178 operates at a fixed divide-by-P2 (e.g., P2=16) fraction of the Host Ingress clock (e.g., generated by the frequency divider /P2 block 214-b).

The Ingress Framer/Mapper 178 comprises Line Ingress Framer/Mapper 280 and Host Ingress Framer/Mapper 260. The Line Ingress Framer/Mapper 280 aligns the four lanes of the incoming signal compensating skews and rotations and reflections of the constellation. Gear box 177 adjusts for parallelization and FEC Decoder 180 terminates the line FEC. FEC Decoder 180 uses hard or soft decisions to detect and correct errors. Host Ingress Framer/Mapper 178 optionally encodes and incorporates GFEC overhead bits and passes the frames to the Host Ingress interface 182. FIFO 270 prevents data loss when transitioning between the Line and the Host clock domains. The difference between the FIFO 270 pointers acts as a phase error signal (e.g., illustrated as a feedback signal with a dotted line) to control the Host Ingress PLL 240.

Analogous to the interpolation interface described with reference to FIG. 2a for the transceiver egress path, interpolator 164 interfaces between DSP Front End (DFE) 155 (through FIFO 163) and DSP Core 169—which function at different clock rates and operate at different sampling rates. Interpolator 164 performs a sampling rate conversion between the clock rate of ADC 152 (typically driven directly by the Line Ingress PLL or LI PLL 252, at 16 GHz) to the variable clock rate set in the DSP core 169 (typically in the 333-1333 MHz range). The clock rate in the DSP core 169 is equal to the baud rate divided by the parallelization factor of the DSP. In one embodiment the parallelization factor of the DSP is equal to 80, therefore if in a certain channel the baud rate is, for example, 32 GBaud, the DSP clock rate would be 400 MHz. The fractional ratio or relationship between the data rate at ADC 152 and at the DSP Core 169 is typically in the range of 12-48 and is controlled by 256-b. In some embodiments, the baud rate may change by relatively large factors across different optical channels or in different configurations. For example, the Ingress Path may be designed to operate on channels whose baud rates vary in the range of 23 to 32 GBaud. While the baud rate may vary over different channels, the ADC sampling rate is typically kept constant in one embodiment, or may vary within a relatively narrow range. Since the DSP core sampling rate is twice the baud rate, the Interpolator 164 may accommodate a wide range of interpolation factors. These interpolation factors can be changed by configuration, but they remain fixed during the transceiver operation on a given channel. In addition to accommodating this wide range of sampling rate conversions, the Interpolator 164 compensates for the relatively small and random frequency difference between the local receive clock and the baud rate of the received signal under the control of Timing Recovery 166. This means that, once the Timing Recovery 166 has acquired synchronization, the local receive clock will be identical in frequency to the baud clock of the incoming signal, and the Interpolator 164 will adjust its interpolation factor (under the control of Timing Recovery 166) to provide the correct sampling rate conversion.

Along the ingress path, placing the Interpolator in the DSP clock domain simplifies the architecture, because a fixed size (number of samples) of the output block is desired. This number is equal to twice the parallelization factor. In one embodiment the parallelization factor of the DSP is 80, therefore the number of signal samples in the output block is 160. In a parallel processing architecture, each sample is computed by a separate filter, therefore having a constant number of samples in the output block means that a constant number of filters is desired. The size of the input block is variable, but this is more easily handled in a hardware implementation than a variable output block size. If the Interpolator was placed in the Digital Front End (DFE) clock domain, the number of input samples would be constant, but the number of output samples would be variable leading to an architecture where a variable number of filters must be allocated to the computation. This leads to a more complex hardware implementation. Therefore, in one embodiment the Ingress Path Interpolator is placed in the DSP Core clock domain.

FIG. 3a includes a block diagram for performing interpolative timing recovery along the transceiver ingress path, according to some embodiments.

A remote transmitter communicating with the local receiver (e.g., illustrated in FIG. 1b and FIG. 2b) for a given transceiver circuit may not be clock-synchronized due to imperfections and frequency mismatches between the crystal oscillators that control their respective clocks. Timing Recovery estimates an extent of such dyssynchrony (e.g., as a frequency error) and adjusts the local clock in order to track the remote clock. Timing Recovery 166 at the receiver or ingress path tracks the frequency and phase of the received signal; both of which are controlled by a clock at a remote transmitter and are estimated at the receiver. Timing Recovery 166 compensates for frequency errors of approximately +/−200 ppm or better, and tracks jitter in the received signal. In some embodiments timing recovery 166 is designed to operate robustly in the presence of nonstationary PMD and rotations of the state of polarization of a received signal.

Timing Recover 166 includes a feedback loop (comprising frequency and phase detector 274, a P+I Loop Filter 276 and a Numerically Controlled Oscillator (NCO) 278) that computes the frequency and phase of a received signal and provides a numerically generated control signal to the interpolator 164. Under the control of Timing Recovery 166, Interpolator 164 provides samples of the received signal at predetermined instances along the received signal to the FFE 170, which in turn interpolates signal sample values at instants between these predetermined samples.

Phase and Frequency Detector 274 computes a phase error as a difference between the square magnitude of the (complex) samples of the received signal sampled at instances T/4 before and T/4 after a center of the eye (as shown in FIG. 3b). Phase and Frequency Detector 274 thereby generates a substantially sinusoidal tone at a frequency corresponding to the difference frequency between a local sampling clock at the receiver and a transmit clock at the transmitter. The Phase Detector seeks the zero crossings of this sinusoidal tone. The T/2 Feedforward Equalizer 170 computes a sample value at the center of the eye by interpolating between the samples at instances T/4 before and T/4 after the center. This method works well in the presence of intersymbol interference. However, the Phase Detector is preferably placed at the output of the BCD Equalizer 158 (which reduces the effects of ISI) to avoid excessive ISI in the received signal.

Various implementations of phase detectors may be used, such as the "Wave Difference Method" described in Agazzi et al, "Timing Recovery in Digital Subscriber Loops", IEEE Transactions on Communications, June 1985, pp. 558-569. Similarly, various implementations of frequency detectors may be used, such as the Rotational Frequency Detector method described in "Frequency Detectors for PLL Acquisition in Timing and Carrier Recovery," D. G. Messerschmitt, IEEE Transactions on Communications, 1979, pp. 1288-1295.

The Timing Recovery 166 is based on a traditional second order phase locked loop, which has the benefit of forcing the frequency error to exactly zero (unlike a first order loop, which may allow for some residual frequency error). The integral part of the loop filter 276 estimates the frequency error and the NCO integrates the estimate of the frequency error to generate an estimate of the phase error as a function of time. This estimate is used by Interpolator 164 to select filters with the proper phase delay from its interpolation filter bank, therefore compensating the phase error in the input signal and providing a properly phase-adjusted signal to the subsequent stages of the Ingress Path.

The Interpolator 164 uses a bank of filters that introduce a delay to the signal received from FIFO 163. These filters have a substantially constant magnitude response as a function of frequency, and approximately linear phase response. The delay introduced by the interpolator 164 is the derivative of the phase response with respect to frequency. Each filter in the filter bank has a constant but different delay. In one embodiment the delay of filter k in the filter bank is $kT_s/64$, where $T_s$ is the sampling period of the signal at the input of the Interpolator 164 and $0<=k<64$ is an index that identifies the selected filter. By changing k the Interpolator 164 can change the delay of the signal, which results in a change of the sampling phase of the output of the Interpolator 164. By changing k linearly as a function of time, the sampling phase also changes linearly, and this results in a change of the sampling frequency. In this way the sampling phase at the output of the Interpolator 164 can be adjusted to be equal to twice the baud rate of the received signal. Index k is controlled by Timing Recovery 166 in order to adjust the sampling frequency. By changing k as a different function of time, Timing Recovery 166 can also track jitter present in the incoming signal.

In some embodiments, the interpolator also performs skew compensation at the egress path, thereby compensating for the differential delays among the four lanes introduced by the electrical signal path, as well as skews of the modulator and modulator driver. The skew compensation is user programmable, typically within a range of approximately +/−2.8 UI.

FIG. 3c illustrates an example of an interpolator filter design used to perform sampling rate conversions in the egress or ingress paths, according to some embodiments. The interpolator filters (e.g., Interpolator 112 along the egress path and Interpolator 164 along the ingress path) are finite impulse response filters with a structure shown in FIG. 3c.

In FIG. 3c, the interpolation filter 164 receives input samples 281 from FIFO 163 at an input data rate controlled by received clock 290. The size of the blocks of input and output samples is related by the interpolation factor. For example, the signal at the input of the interpolator is typically sampled at a rate lower than twice the baud rate, whereas the output is sampled at exactly twice the baud rate. In one embodiment, the size of the input block is approximately 140 samples, although it may be slightly larger or slightly lower than that number, depending on the precise relationship of the input sampling rate and the baud rate. The interpolator determines the exact size of the input block and requests the appropriate number of samples from FIFO 163. The size of the block of output samples is equal to twice the parallelization factor of the DSP Core 169. In one embodiment the parallelization factor of the DSP core is 80, therefore the size of the interpolator output block is 160 samples. The sampling rate at the input of Interpolator 164 is controlled by the Line Ingress PLL 252. At the beginning of the operation of the transceiver the clock generated by PLL 252 is free running and therefore the relationship between the sampling rate of the signal at the input of Interpolator 164 and that at its output is random. This results in FIFO 163 getting more or less samples at its input than taken at its output, therefore the difference between its write and read pointers is increasing or decreasing. This difference (minus some constant n) is used by the Line Ingress PLL 252 as a phase error signal, and when the Line Ingress PLL 252 acquires synchronization the difference reaches the constant n, the phase error is reduced to zero, and the relationship between the Interpolator 164 input and output sampling rates (and block sizes) is strictly controlled by divide-down factors N (256-a) and M (256-b). This results in FIFO 163 receiving as many samples as the Interpolator 164 takes, therefore it never overflows or underflows. Interpolator 164 processes the input samples 281 by convolving an input data word formed by a series of samples 281 with a set ($P_{INDEX}$) of interpolation filter coefficients retrieved from the interpolation coefficients table 285 to produce output samples 295 at an output data rate specified by clock 290. The set ($P_{INDEX}$) of interpolation filter coefficients are selected and retrieved from the interpolation coefficients table 285 in accordance with the desired output data rate specified by the clock 290 via a table index 292 generated based on the output clock rate. Output samples 295 are then generated and provided at the specified output data rate based on the clock 290. In one embodiment, Interpolator is in the ingress path and clock 290 is the output of divide-by-M block 256-b.

Carrier Recovery

FIGS. 4a-4d include block diagrams for performing fine carrier recovery and decision demapping along the transceiver ingress path, in accordance with some embodiments.

The fine carrier recovery blocks 172, 174 estimate and compensate for the frequency and phase differences between the transmitted signal carrier (after propagation through the fiber) and the local oscillator. In some embodiments, the phase noise estimation in the carrier recovery block uses either a Viterbi-Viterbi carrier recovery (VV-CR) algorithm or blind phase search (BPS-CR) algorithm. Carrier recovery block 174 may be configured to provide either VV-CR or BPS-CR algorithms and to select from among the two algorithms depending on the application mode of the transceiver. When large laser phase noise is present in the FFE samples, the BPS-CR algorithm generally provides superior noise performance. For example, in one embodiment, a BPS-CR algorithm is applied when the DSP is configured for DP-16QAM demodulation. DP-16QAM demodulation is particularly sensitive to laser linewidth (LW), which degrades the performance of DP-16QAM when it is used in conjunction with low-power, low-cost integrated lasers (either in the transmitter or local oscillator, or both), which tend to have higher LW (e.g. 500 kHz instead of 100 kHz typical for high quality lasers). The noise performance of the BPS-CR algorithm enables the transceiver to operate using DP-16QAM despite the sensitivity to laser LW. Thus, the described architecture solves the laser LW problem traditionally associated with 16QAM operation. Examples of BPS-CR algorithms are described in: Pfau, T.; Hoffmann, S.; Noe, R.; "Hardware-Efficient Coherent Digital Receiver Concept with Feedforward Carrier Recovery for M-QAM Constellations," Lightwave Technology, Journal of, vol. 27, no. 8, pp. 989-999, Apr. 15, 2009.

The FCR tracks phase noise introduced by lasers and by Cross Phase Modulation (XPM), in order to annul such phase noise. Lasers may also introduce strong sinusoidal (or quasi sinusoidal) frequency jitter (in the order of tens of megahertz), which should be compensated for. In addition, FCR generally has a large capture range, in order to ensure the robust operation during the startup phase of the transceiver. In some embodiments, a combination of a traditional decision-directed PLL with a subsequent Feedforward Carrier Recovery stage based on the Blind Phase Search (BPS) algorithm offers significant performance advantages.

Figure 4A:
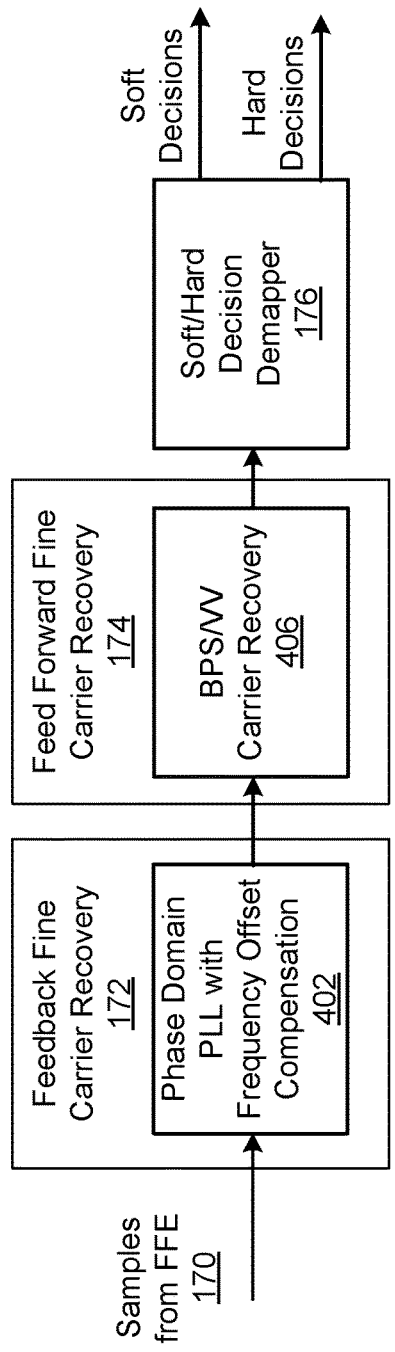
FIGS. 4a-4d include block diagrams for performing fine carrier recovery and decision demapping along the transceiver ingress path, in accordance with some embodiments.

FIG. 4a illustrates a functional block diagram of the feedback fine carrier recovery 172, feedforward fine carrier recovery 174, and soft/hard decision demapping block 176 along the transceiver ingress path 150, in accordance with some embodiments. In the illustrated embodiment, the feedback fine carrier recovery 172 is implemented via a phase domain low latency PLL 402. The feed-forward fine carrier recovery 174, on the other hand is implemented using the Viterbi-Viterbi (VV) algorithm or the blind phase search (BPS) algorithm and is used to reduce the phase noise not compensated by the PLL, as represented by BPS/VV 406. The PLL 402 is decision directed and is used to compensate for frequency offsets or fluctuations in the carrier phase.

The final demodulation is achieved by the soft/hard decision demapper block 176. Based on the demodulated signal, soft (or hard) information used by the channel decoder is computed by the soft/hard decision demapper block 176.

Figure 4B:
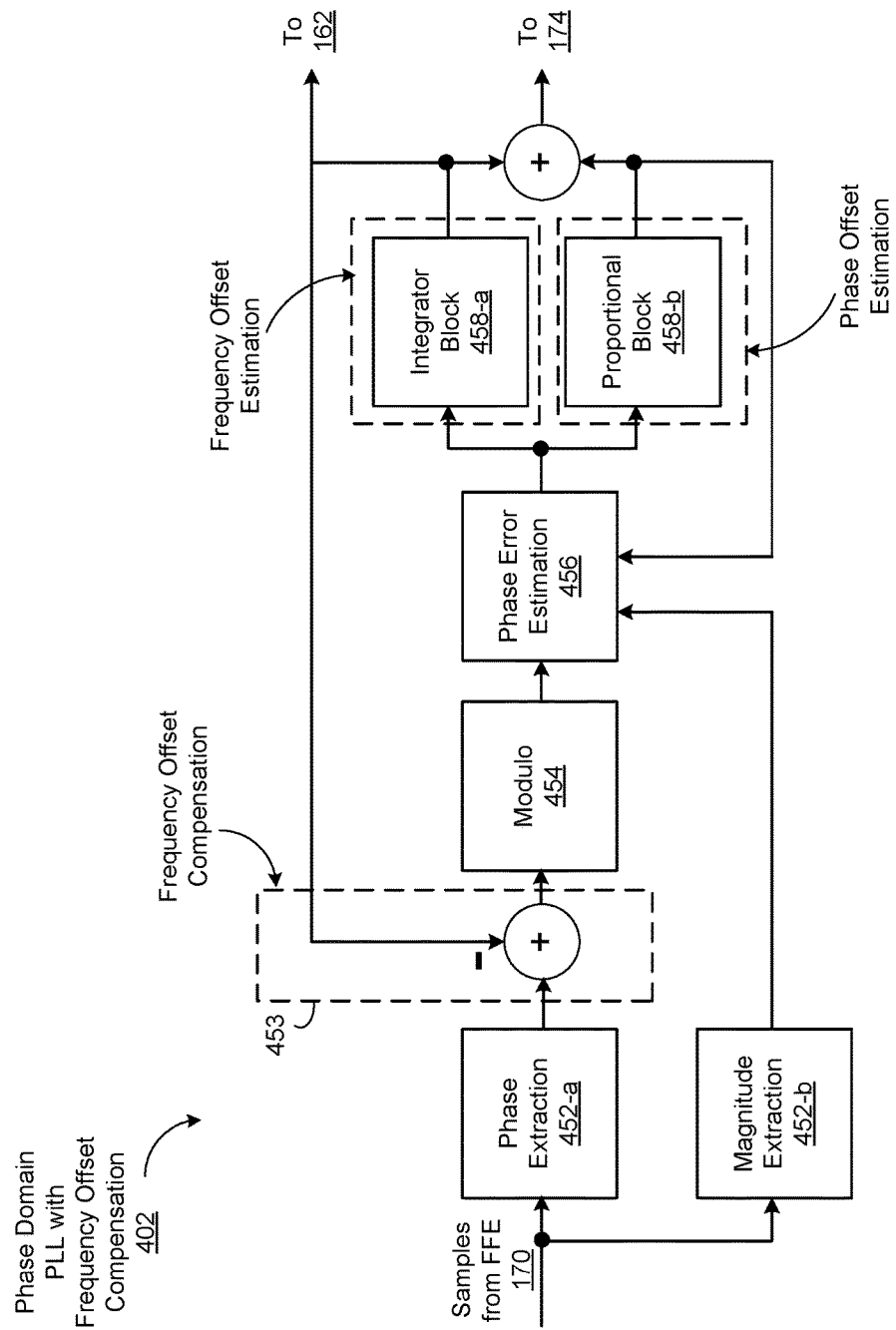

FIG. 4b illustrates a block diagram for implementing feedback fine carrier recovery 172 using a phase domain (e.g., decision directed) PLL with frequency offset compensation 402, in accordance with some embodiments. Samples from FFE 170 are converted to polar coordinates—e.g., phase and amplitude—by phase extraction block 452-a and magnitude extraction block 452-b respectively. A feedback signal is combined with the extracted phase to provide a frequency offset compensation to the extracted phase signal at block 453. Modulo block 454 performs a modulo π/2 operation so as to preserve the phase values of the input signal within the 0 to π/2 range (e.g., within the positive first quadrant of the symbol constellation), thereby exploiting the symmetry of the symbol constellation. The phase error estimation block 456 then implements a first-order low latency PLL to estimate the residual phase error by subtracting phase offset determined by the proportional block 458-b from the phase of the input signal from the modulo block 454 and re-combining this signal with the extracted magnitude from block 452-b. The estimated residual phase error is inputted to the integrator block 458-a and proportional block 458-b to perform frequency offset estimation and phase offset estimation respectively. The frequency offset estimated by the integrator block 458-a is used as feedback to achieve frequency offset compensation in block 453 and may also provide feedback to coarse carrier recovery block 162. This feature may be desirable for several applications such as a fixed low-pass filtering where it is assumed that the spectrum of the input signal is centered around the zero frequency. The phase offset estimated by the proportional block 458-b is provided as feedback to the phase error estimation block 456. The outputs of the integrator block 458-a and proportional block 458-b are combined and provided to feed forward fine carrier recovery block 174.

The phase domain PLL 402 is most effective if it has low latency. Traditional parallel processing PLL architectures have large latency, which results in low bandwidth, limited capture range and poor tracking capabilities. Optimized, low latency VLSI architectures enable high performance parallel processing PLLs. Implementation of the PLL is greatly simplified if it is done in the phase domain. Capture range can be greatly increased with the addition of a frequency detector. A frequency detector overcomes the capture range limitations caused by latency and parallel processing. In one embodiment, a Rotational Frequency Detector is used as described in "Frequency Detectors for PLL Acquisition in Timing and Carrier Recovery," D. G. Messerschmitt, IEEE Transactions on Communications, 1979, pp. 1288-1295.

Figure 4C:
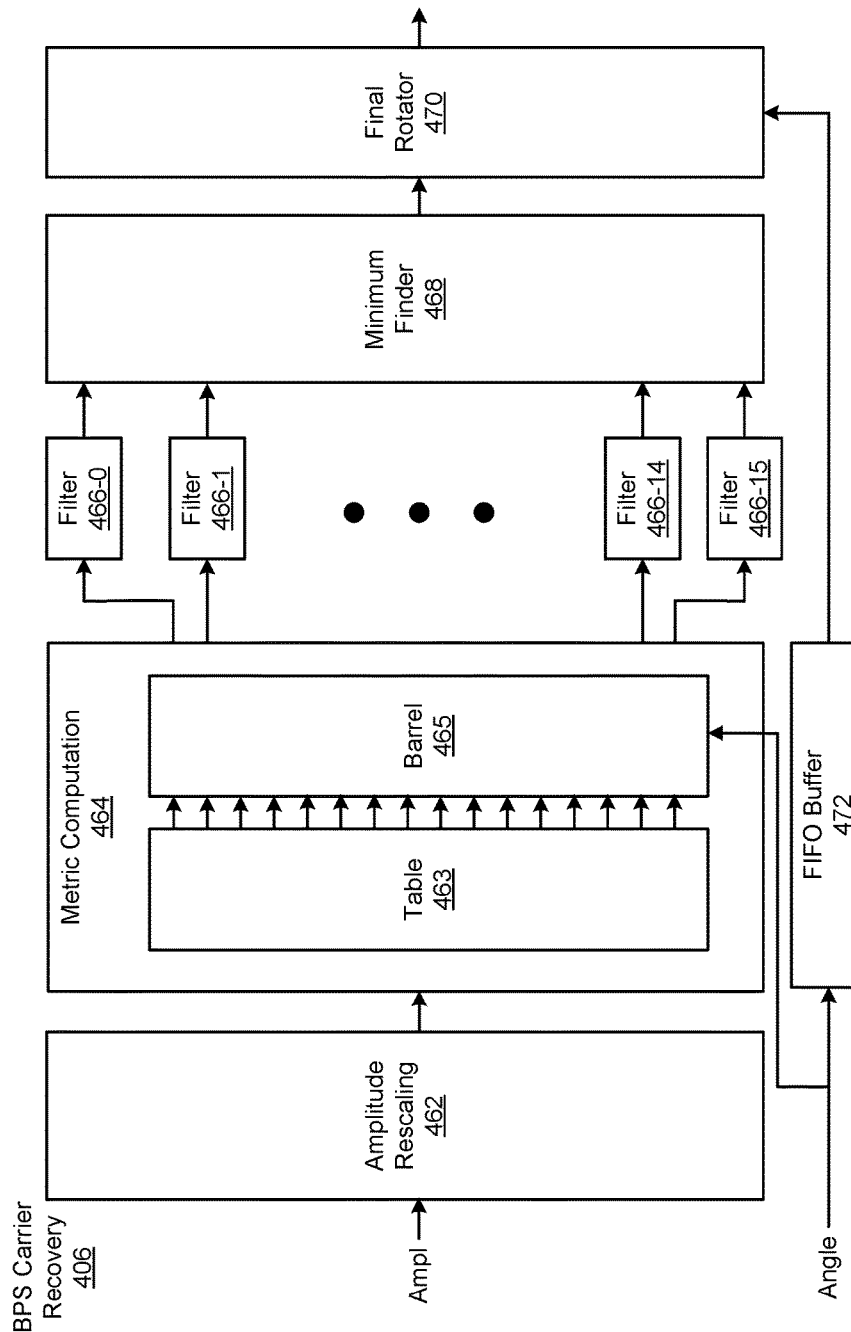

FIG. 4c illustrates a block diagram for implementing feedforward fine carrier recovery using a Blind Phase Search (BPS) algorithm, in accordance with some embodiments. The architecture comprises the amplitude rescaling block 462, the metric computation block 464 including a table 463 and a barrel shifter 465, the filter blocks 466, the minimum finder block 468, the final rotator 470, and the FIFO 472. A parallelism factor (e.g., 80) is used and the architecture is replicated based on the parallelization factor to obtain multiple parallelization channels.

The goal of the BPS algorithm is to determine and compensate for phase shift of the input symbols. In this algorithm, metrics are determined for a plurality of test phases with the metric corresponding to a matching strength between the observed phase offset and the tested phase offset.

The Blind Phase Search (BPS) algorithm can be simplified by representing the input to the BPS block 406 in polar coordinates. The conversion from Cartesian to polar coordinates can be done, for example, using the Cordic algorithm.

The search phases are created by adding B equally spaced values in the interval [0, π/2) to the phase of the input symbol for QPSK and QAM modulations or in the interval [0, π) for BPSK modulation, and quantizing the result to the nearest neighbor in a grid with quantization step π/(2B) or π/B respectively. Polar coordinate is used for the input and output complex symbols—e.g., angle and amplitude components are used instead of real and imaginary components. For example, 16 equally spaced test phases may be used.

Amplitude rescaling 462 scales the amplitude range of the input symbols according to the largest amplitude of the modulation, thereby allowing flexibility across modulation schemes to be supported (such as BPSK, QPSK, 16QAM).

The metric computation block 464 comprises a table 463 and a barrel shifter 465. For each possible amplitude value, the table stores a pre-computed or predetermined metric for each of the search or test phases (e.g., 16 test phases). The table 463 stores precomputed square Euclidean distance between the received symbol and its sliced version for each test phase. The barrel shifter 464-b rotates the metrics at the output of the table according to the angle of the input symbol. This ensures that the metric routed to each of the filters 466 belongs to the same test phase.

When the modulation scheme has rotation symmetry lower than 360 degrees, not all angle bits are used as input to the barrel shifter (for example, QPSK and 16QAM have 90 degree symmetry while BPSK has 180 degree symmetry). In some embodiments, a bits selection is carried out by a bit-selector block according to the modulation scheme (for example, for QPSK and QAM16 the two most significant bits are discarded, while for BPSK the most significant bit is discarded).

The filter block 466 includes a filter for each of the test phases. The filter blocks 466 are finite impulse response (FIR) filters with impulse response given by a sequence of N consecutive coefficients set to a value of one. The value N can be modified while the algorithm is running without disrupting the normal operation. An optimum value of N may depend of the level of phase noise and it is optimized by an external algorithm.

The minimum finder block 468 identifies a test phase that corresponds to a minimum metric value.

The minimum finder block 468 provides the identified test phase to the final rotator block 470. The final rotator block 470 performs phase correction over the input symbols according to the minimum metric phase computed by the minimum finder block. The FIFO buffer 472 compensates the latency of all blocks after the final rotator 470.

Figure 4D:
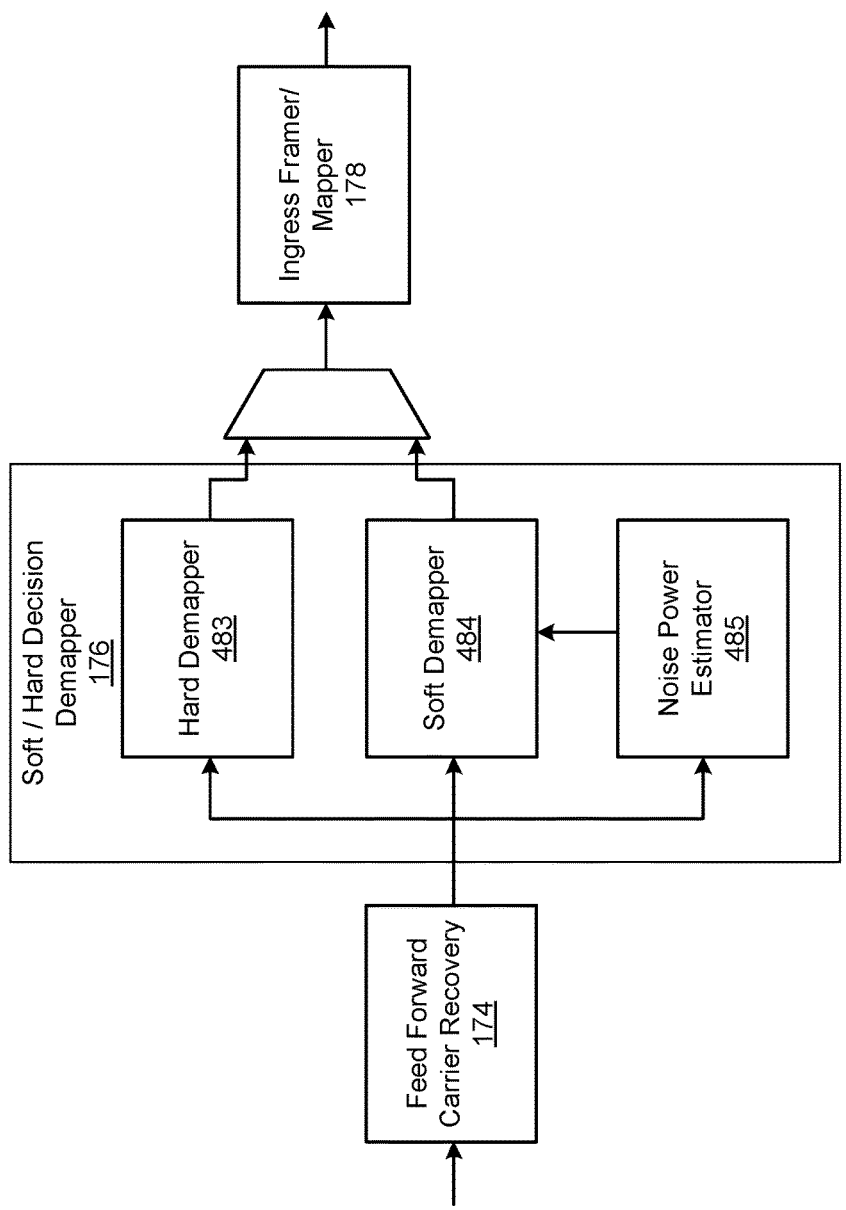

FIG. 4d illustrates a block diagram of a demapper along the transceiver ingress path, in accordance with some embodiments. The supported modulation schemes are: binary phase shift keying (BPSK), differential BPSK (dBPSK), quadrature phase shift keying (QPSK), differential QPSK (dQPSK), quadrature amplitude modulation with 16 points (16QAM), and differential 16QAM (d-16QAM). The architecture comprises three main blocks: Hard-Demapper 483, Soft-Demapper 484, and Noise Power Estimator 485. The Hard-Demapper 483 computes the most probable transmitted bits based on the received symbols. These bits are used, for example, as the input to a hard-decision Forward Error Correction (FEC) code. On the other hand, the Soft-Demapper 484 provides soft-information (e.g., the log-likelihood ratio of the bits) used, for example, as input to a soft-decision FEC code. Finally, the Noise Power Estimator 485 computes the average value of the noise power for the real and the imaginary components of the received signal. This power estimation is used by the Soft-Demapper 484 to compute the log-likelihood ratio of the received bits. The instant noise level is estimated based on the difference between the received symbol and a detected version of it. To avoid a noise estimation error caused by a wrong decision in the slicer, the proposed algorithm can be configured to only estimate the noise when the received symbol is outside the perimeter of the constellation (i.e., when the received symbol is not between two or more symbols of the constellation). Once the instant noise value is estimated, it is squared and filtered by a recursive filter in order to estimate the average noise power. Additionally, the algorithm includes a configurable linear correction factor which can be used to compensate for an error in the estimation of the noise power caused by a non zero mean value of the noise or other effect.

Bulk Chromatic Dispersion Equalizer

Figure 5A:
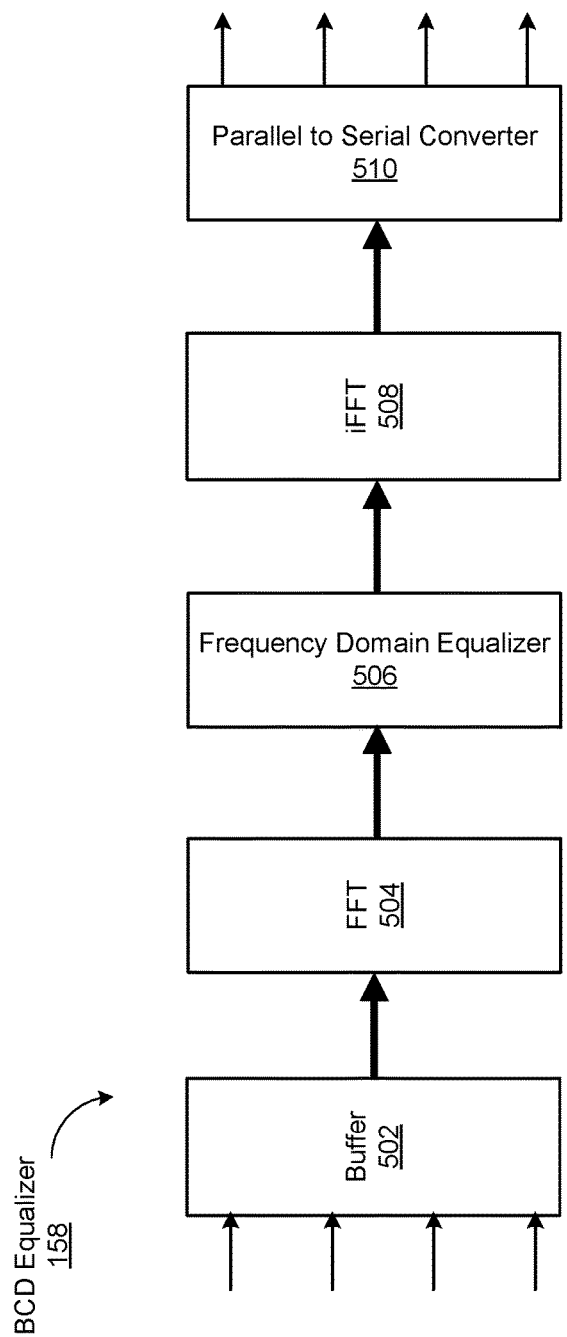
FIGS. 5a-5b include block diagrams of components (e.g., a bulk chromatic equalizer) along the transceiver ingress path for compensating for chromatic dispersion introduced by an optical channel, in accordance with some embodiments.
Figure 5B:
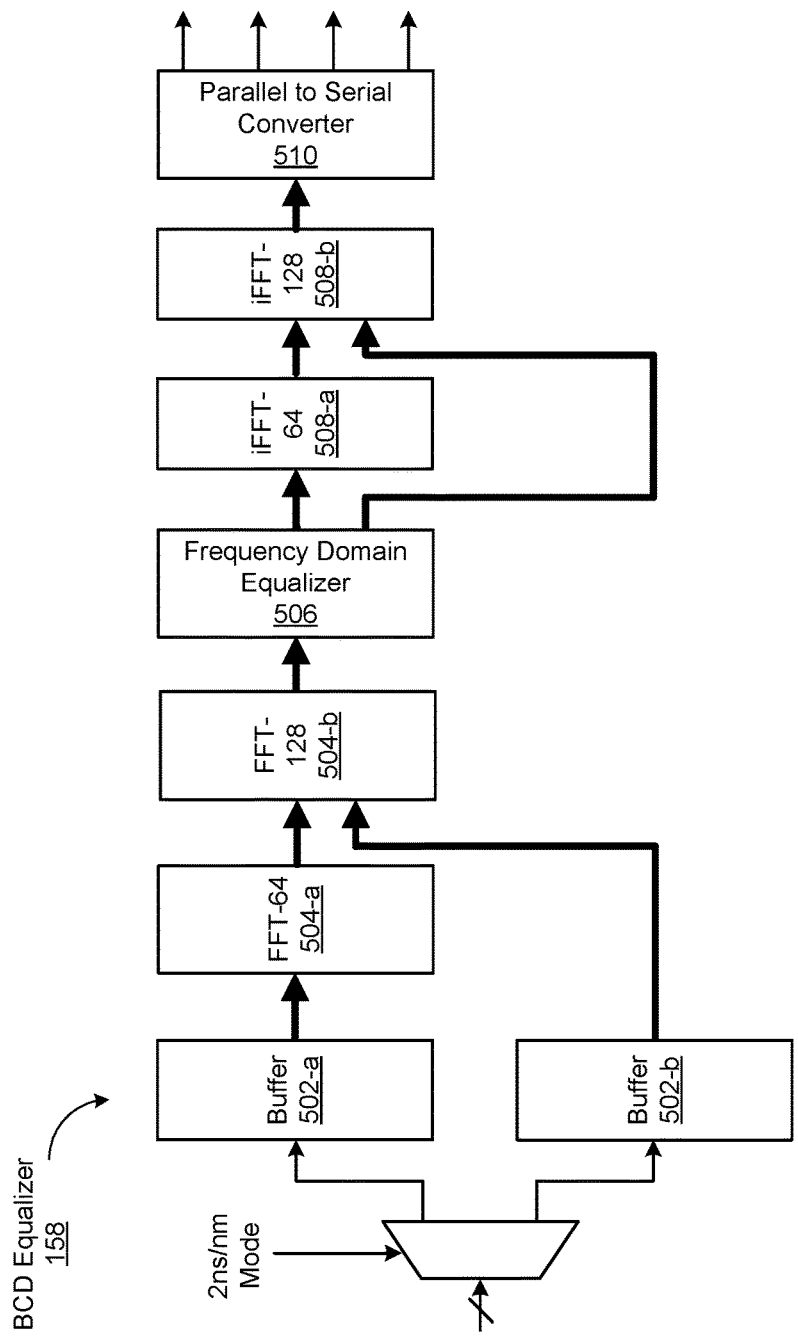

FIGS. 5a-5b include block diagrams of components (e.g., a bulk chromatic dispersion equalizer, or "BCD Equalizer" 158) along the transceiver ingress path for compensating for chromatic dispersion introduced by an optical channel, in accordance with some embodiments.

The BCD Equalizer 158 is an FIR filter with a response that is designed to compensate for the chromatic dispersion in the optical fiber. Chromatic dispersion typically results in phase distortion, with a phase response characteristic that varies approximately quadratically with frequency, and with substantially no amplitude distortion. To compensate for the chromatic dispersion of the fiber, a BCD compensation filter has constant magnitude (as a function of frequency) and a phase response that is equal in magnitude but has the opposite sign of the phase characteristic of the fiber. Because the impulse response of the fiber affected by chromatic dispersion is typically very long, the BCD Equalizer is more efficiently implemented as a frequency-domain filter.

For efficiency, the FIR filter is implemented in the frequency domain using the overlap and save method and, optionally, works on blocks of 8K samples (a fraction of the samples form the "overlap block," which repeats samples from a previous block). The BCD Equalizer 158 has a plurality of different modes of operation, each mode of operation selected based on an expected amount of chromatic dispersion (CD) introduced by the optical channel. In some embodiments, BCD Equalizer 158 compensates for an amount of CD up to approximately 250 ns/nm. As shown in the table below, for an expected CD of 250 ns/nm, the overlap block is 50% of the FFT block size. The percentage of overhead incurred by the overlap block is reduced for lower amounts of expected CD. The FIR filter implements the CD compensation function, and in some embodiments, also performs spectral shaping (e.g., SQRT RC filtering) and partial equalization of the response of the one or more electronic components and/or the effect of optical channel and optical filters.

FIG. 5a illustrates a block diagram of an architecture that includes a frequency domain BCD equalizer 158 for compensating for bulk chromatic dispersion, in accordance with some embodiments.

A block of input samples is stored in Buffer 502 and a Fast Fourier Transform 504 is applied. The output of FFT 504 is multiplied by the desired BCD Equalizer frequency response 506 and then converted back to a time domain representation by iFFT block 508. Finally, the output signal is serialized by Parallel to Serial Converter 510 and sent to the subsequent stages of the receiver. In one embodiment the frequency domain equalizer 506 is implemented based on the Overlap and Save method. In such embodiments, the block of input samples consists of a certain number of new samples and a certain number of samples repeated from the previous block. The number of repeated samples (or overlap block) is determined by the length of the impulse response of the optical channel is to be equalized. In one embodiment the input block size is 8192 samples, and the size of the overlap block is given by Table 1 below. The size of the overlap block depends on the mode of operation, where the mode is determined by the maximum amount of chromatic dispersion that the BCD Equalizer must compensate.

In some embodiments the Fiber Length Estimator (FLE) 160 (described with reference to FIG. 1b) is used to select the frequency response of the BCD Equalizer to accurately compensate for an expected value of CD introduced by the optical channel. The FLE 160 conducts an exhaustive search over all fiber lengths, using an appropriate fiber length step. The search is performed on the interval [−CDmax, CDmax], where CDmax is the maximum value of CD specified for a given BCD mode of operation. For each test length, a metric defined by an average value of the $4^{th}$ power of the signal at the output of the BCD Equalizer 158, is computed. The fiber length estimate is a trial length that minimizes the above metric. In order to reduce the search time, gearshifting is used; a first coarse search is conducted with a larger fiber length step, followed by a refined search with a smaller fiber length step.

FIG. 5b illustrates selection of hardware components within the BCD Equalizer based on a mode of operation of the BCD Equalizer, in accordance with some embodiments.

As described in Table 1 below, the BCD Equalizer has four modes of operation: (a) 250 ns/nm mode; (b) 125 ns/nm mode; (c) 55 ns/nm mode; and (d) 2 ns/nm mode. The BCD Equalizer comprises two cascaded FFT blocks 504 (e.g., comprising FFT-64 block 504-a and FFT-128 block 504-b) and two cascaded iFFT blocks 508 (e.g., iFFT-64 block 508-a and iFFT-128 block 508-b). In the 250, 125, and 55 ns/nm modes, both of the cascaded FFT blocks 504 and both of the cascaded iFFT blocks 508 are used to realize or implement the BCD Equalizer function. However, in the 2 ns/nm mode, the FFT-64 block 504-a and the iFFT-64 block 508-a are circumvented, or not used; rather, only the FFT-128 block 504-b and the iFFT-128 block 508-b are used. This is because in the 2 ns/nm mode, the block size can be made much smaller as a result of the short length of the channel impulse response that must be compensated. In one embodiment the total input block size is 128 samples, and size of the overlap block is 64 samples.

As shown in the Table 1 below, selection of a clock frequency depends on the mode of operation. The different clock frequencies for the different amounts of dispersion compensation shown in the table are related to the different numbers of new samples processed in any given clock cycle of the FFT engine, as a result of the Overlap and Save method. The number of overlap samples is given by the length of the impulse response of the optical fiber, which depends on the amount of chromatic dispersion to be compensated. When the amount of chromatic dispersion decreases, the length of the impulse response of the fiber also decreases and the number of overlap samples decreases accordingly. Since the total number of samples (overlap plus new) is fixed and given by the size of the FFT, the number of new samples processed per clock cycle increases when the compensation decreases. This enables a decrease in the clock frequency, which is used advantageously to reduce the power dissipation of the BCD Equalizer. For example consider the cases of 250 ns/nm and 125 ns/nm in the table below and assume the FFT size is 8192. The respective numbers of overlap samples are 4096 and 2560, therefore the respective numbers of new samples processed are 8192-4096=4096 and 8192-2560=5632. Therefore, given that the clock frequency for the 250 ns/nm case is 250 MHz (this frequency is determined based on digital design criteria), the frequency for the 125 ns/nm case must be 250×4096/5632=181.81 MHz. Similarly, for the 55 ns/nm case the number of new samples processed per clock cycle is 8192-1024=7168, therefore the desired clock frequency is 250×4096/7168=142.85. The case of 2 ns/nm is different because in this case large power savings are obtained by reducing the size of the FFT to 128, which is possible in the engine of FIG. 5-b by bypassing buffer 502-a and FFT-64 block 504-a. In this case the clock frequency is again 250 MHz as in the case of 250 ns/nm, but the number of active gates in the hardware implementation is drastically reduced, which results in a major power reduction.

TABLE 1

| Compensation | Overlap | | Clock Frequency |
|---|---|---|---|
| ns/nm | % | Samples | MHz |
| 250 | 50.00 | 4096 | 250.00 |
| 125 | 31.25 | 2560 | 181.81 |
| 55 | 12.50 | 1024 | 142.85 |
| 2 | 50.00 | 64 | 250.00 |

Architectures for Framing/Mapping

FIGS. 6a-6d illustrate architectures for a 200 G framer/mapper muxponder used to perform framing and mapping along the ingress and egress paths for a plurality of transceiver channels, according to some embodiments. Used here, the term "200 G" is a label that means data rates of approximately 200 Gb/s excluding FEC and overhead. A muxponder is an element that transmits and receives optical signals on an optical fiber and provides a capability for multiplexing two or more sub-rate client or host interfaces onto a single line interface.

Figure 6A:
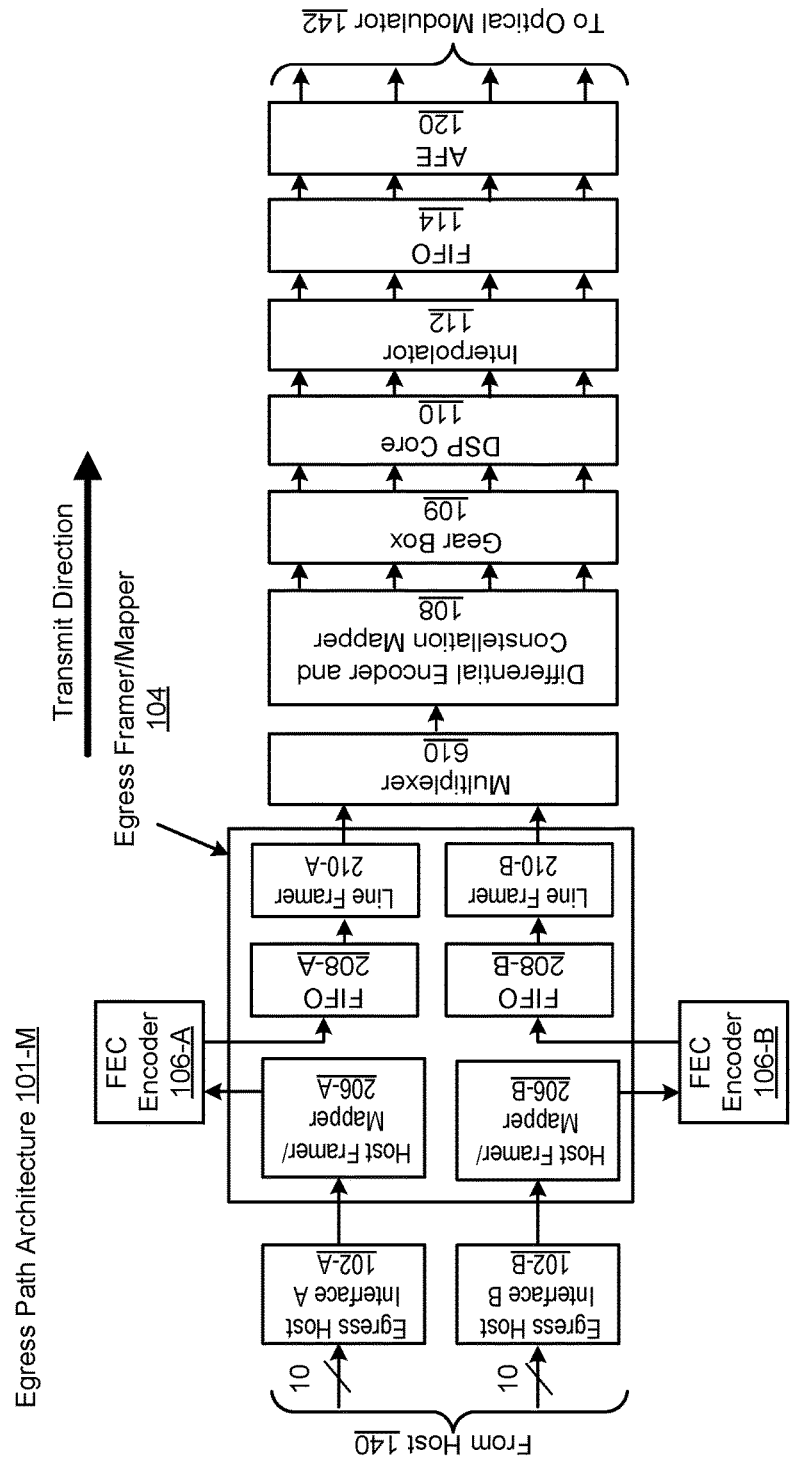
FIGS. 6a-6f illustrate various muxponder architectures for multiplexing a plurality of client interfaces into a single line interface, in accordance with some embodiments.

FIG. 6a shows an Egress path 101-M for multiplexing two host signals as data streams A and B into a single line signal provided to optical modulator 142. Egress Host Interfaces, 102-A and 102-B, each receive a plurality of digital signals from the host 140. Egress Framer/Mapper 104, comprises the Host Egress Framer/Mappers 206-A and 206-B and the Line Egress Framers 210-A and 210-B. The Host Framer/Mappers 206-A and 206-B identify frames in the data received from the Host Interfaces 102-A and 102-B and optionally terminate the GFEC if present in the data. FEC Encoders 106-A and 106-B determine error correction bytes, and the Line Framers 210-A and 210-B assemble the transmitted frames, adding the line FEC parity bits and other overhead bits. Between Host Egress Framer/Mappers 206-A and 206-B and Line Egress Framers 210-A and 210-B, FIFOs 208-A and 208-B ensure proper transitioning between the Host Egress and the Line Egress clock domains. The difference between the read and write pointers of this FIFO acts as a phase error signal to control the Line Egress PLL 222 (as explained with reference to FIG. 2a). Either FIFO 208-A or FIFO 208-B can provide the phase error signal, and Line Egress Framers 210-A and 210-B operate at a sufficiently high output data rate to accommodate the maximum difference in data rates expected between the two host signals, regardless of which FIFO is selected. Line Framers 210-A and 210-B have sufficient rate justification capacity to compensate for any rate mismatches between the bit rates on the A path and the B path. The bit rates at the outputs of Line Framers 210-A and 210-B are identical. Line Framers 210-A and 210-B apply unique identifiers to their respective streams so the two streams can be multiplexed into a single stream and then later separated at the far end of the link in an unambiguous manner.

Line Framers 210-A and 210-B, pass data to Multiplexer 610, which combines data from the multiple Line Framers into one data stream. Multiplexer 610 forwards data to Differential Encoder and Constellation Mapper 108, which maps the data stream onto a constellation according to a predetermined protocol. The remainder of the signal path is similar to the single stream Egress Path explained with reference to FIGS. 1a and 2a. Signals may be transmitted as straight or differential DP-16QAM. Other coherent modulations including DP-QPSK and DP-BPSK may alternatively be used. In one embodiment, Host 140 provides two OTU4 signals which are multiplexed and transmitted as a e.g. DP-16QAM signal operating at DAC 126 rate of 64 GSa/s and a line data rate of 256 Gb/s. The line data rate depends on the overhead associated with the implemented FEC, overhead used for synchronization, and overhead for cycle slip protection.

Figure 6B:
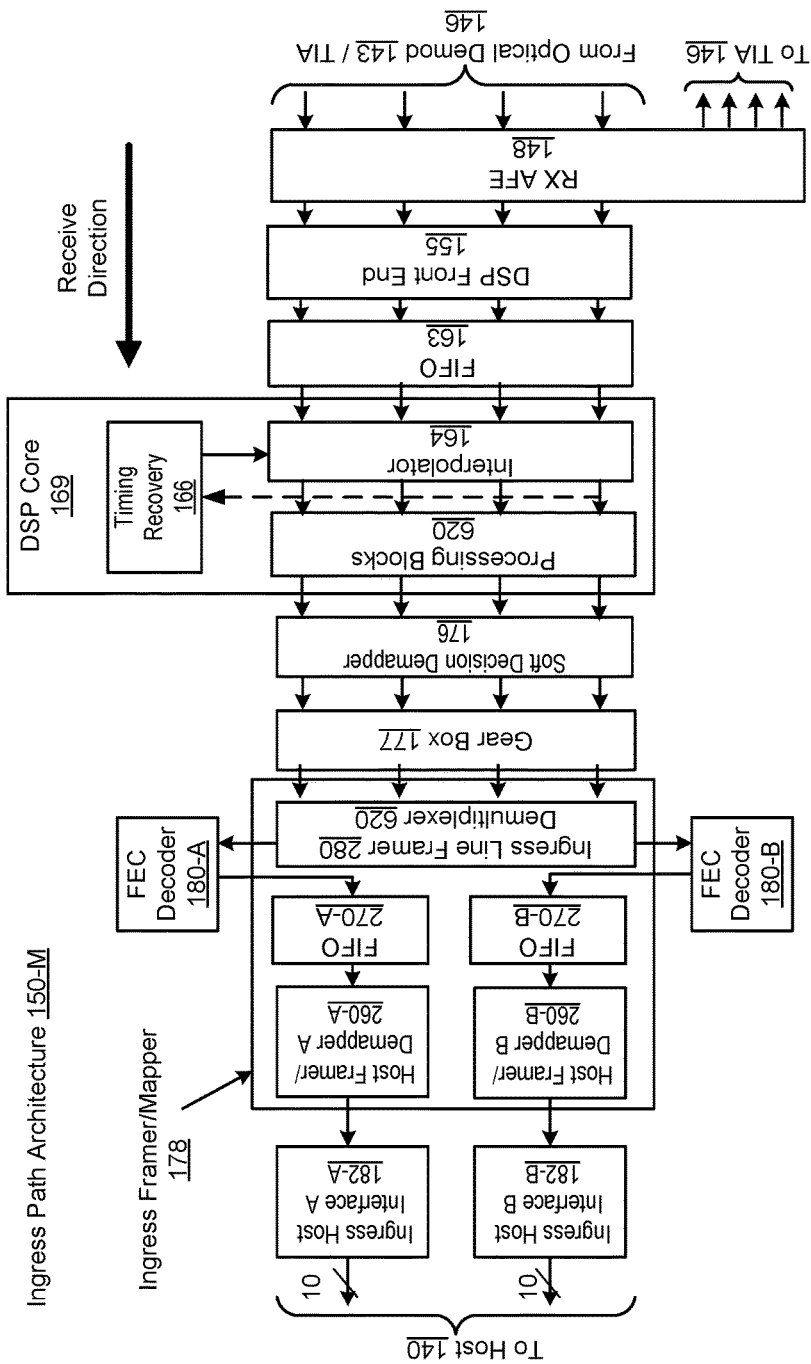

FIG. 6b illustrates a muxponder interface ingress path 150-M that supports a multiprotocol input output interface, in accordance with some embodiments.

The ingress signal path is analogous to the single stream Ingress path (e.g., explained with reference to FIGS. 1b and 2b) until the combined signal arrives at Gear Box 177 and Demultiplexer 620.

Ingress Framer/Mapper 178 comprises Line Ingress Framer/Mapper 280 and Host Ingress Framer/Mapper 260-A and 260-B. Gear Box 177 changes the parallelization factor of the signal and Ingress Line Framer 280 and Demultiplexer 620 find the frame of the incoming signal and then divide it into two separate host signal paths A and B. The Line Ingress Framer 280 aligns the four lanes of the incoming signal compensating skews and rotations and reflections of the constellation. FEC Decoders 180-A and 180-B each receive one of these two signals and terminate the line FEC of the corresponding signal. The Host Ingress Framer/Mapper 260-A and 260-B each optionally incorporate GFEC overhead bits and pass the frames to the Host Ingress Interface 182-A and 182-B. FIFO 270-A and 270-B each ensure that data is not lost when transitioning between the Line and the Host clock regions. The difference between the FIFO pointers acts as a phase error signal to control the Host Ingress PLL 240 (as explained above with reference to FIGS. 1b and 2b).

In one embodiment, Egress Host Interface AB is a multilane interface that implements G.709 Annex C (OTL) or G.709 Annex E (CAUI). The Egress can be configured to receive two OTL signals, two CAUI signals, or one OTL signal and one CAUI signal.

In one embodiment, both signals in the Egress path are of the OTU4 protocol. Host Framer/Mapper 206-A and 206-B each terminate the host FEC to generate ODU4 frames for each path, and map ODU4 frames to each respective OTU4V signal. In one embodiment, Line Egress Framers 210-A and 210-B map the ODU4 frames into each respective OTU4V signal. These ODU4 are per the functional model (G.798), including all rows with section monitoring bits set to 0. FEC Encoder 106-A and 106-B apply a line FEC, which is e.g. an LDPC FEC with a 20% overhead.

In another embodiment, Egress Host Framer/Mapper 206-A and 206-B do not terminate any FEC, if present, and FEC Encoder 106-A and 106-B pass the signals through without altering them; alternatively, FEC encoder 106-A and 106-B are bypassed and the signals are not altered at this point in the flow. Both signals in the Ingress path are unaffected by FEC Decoders 180-A and 180-B, and Ingress Host Framer/Demapper 260-A and 260-B does not alter the FEC fields.

In one embodiment, both signals in the Egress path are of the OTU4 protocol. Egress Host Framer/Mapper 206-A and 206-B terminate GFEC, and FEC Encoders 106-A and 106-B determine error correction bytes and append them to each frame, Both signals in the Ingress path are of the OTU4 protocol, and FEC Decoders 180-A and 180-B terminate the line FEC, and Host Framer/Demapper 260-A and 260-B applies standard G.709 GFEC.

In another embodiment, one of the two Host streams (e.g., A) passes without alteration through the Egress Host Framer/Mapper 206-A and FEC Encoder 106-A, while the other Host stream (in this example, B) has its FEC terminated by the Egress Host Framer/Mapper 206-B and FEC Encoder 106-B applies a line FEC, e.g., a FEC with 7% overhead, where the overhead is chosen such that the encoded B stream has the same nominal bit rate as the A stream. On ingress, the A stream passes unaffected through the FEC Decoder 180-A and Ingress Host Framer/Demapper 260, while the B stream has its line FEC terminated by the FEC Decoder 180-B and the Host Framer/Demapper applies a host FEC, for example standard G.709 GFEC.

In one embodiment, two asynchronous OTU4 data signals are mapped onto two respective OTU4V signals at the Egress, and the OTU4V signals are multiplexed into a single 200 G line signal at the Egress. The two OTU4V signals are synchronous. Each OTU4 signal has a bit rate of +/−20 ppm with respect to the OTU4 nominal rate, resulting in up to 40 ppm between both signals. In this embodiment, the GFEC for each signal path is terminated, and the ODU4 signal corresponding to each OTU4 signal is mapped onto one of two available OTU4V signals using a justification (i.e. bit stuffing) scheme to compensate rate differences. An example justification scheme is Asynchronous Mapping Protocol. Signal identifiers are also inserted into the OTU4V signals to enable the Ingress to identify each OTU4V signal.

Gear Box 177 and Demultiplexer 620 recovers two separate OTU4V frames, which are demultiplexed synchronously. Signal identifiers are recovered and used to route each signal to the associated host signal. FEC Decoder 180-A terminates OTU4V FEC. Each Host Framer/Demapper 260-A and 260-B extracts an ODU4 Frame from OTU4V, maps it onto an OTU4 Frame, and generates and appends OTU4 FEC, also called GFEC. When each Ingress OTU4 frame is generated, justification decisions are decoded from the OTU4V frame, and stuff bytes are discarded. In another embodiment, FEC Decoders 180-A and 180-B do not terminate line FEC, and Host Framer/Demappers 260-A and 260-B process the signals through without altering the FEC.

In one embodiment, OTU4 signals received by Egress Host Interface 102-A and 102-B are synchronous, and are combined synchronously without using justification and stuff bytes. In another embodiment, CAUI signals received by Egress Host are mapped into synchronous OTU4 signals at Host Framer/Mapper 206-A and 206-B.

Figure 6C:
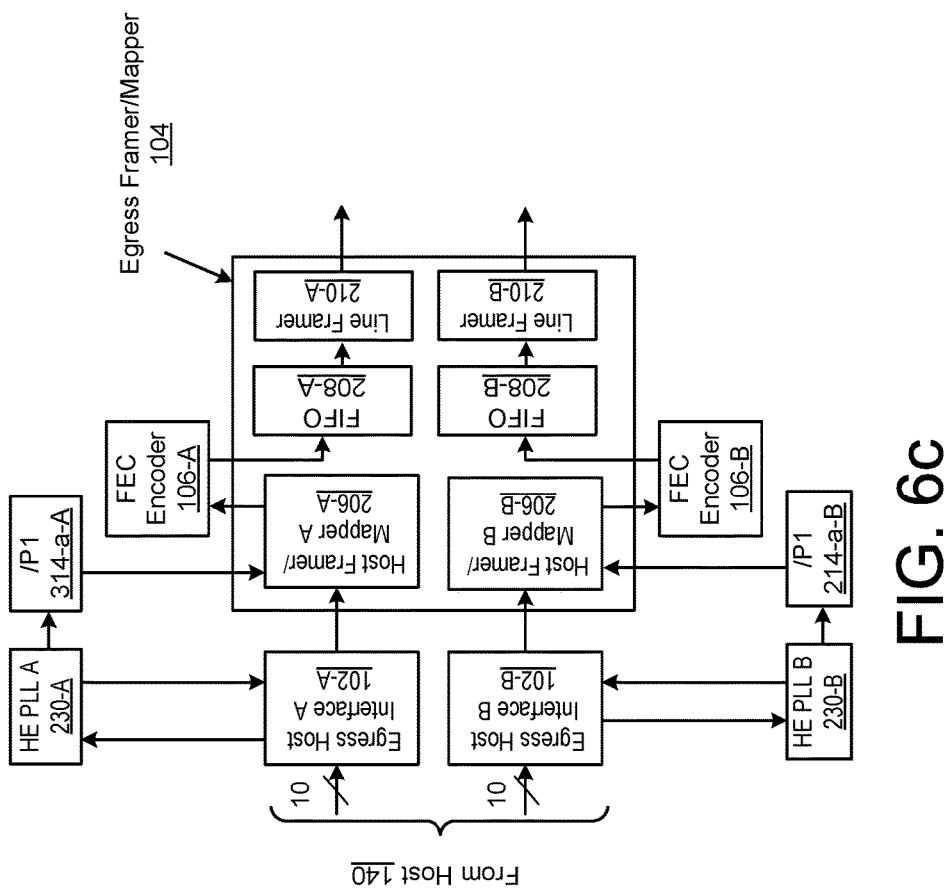
Figure 6D:
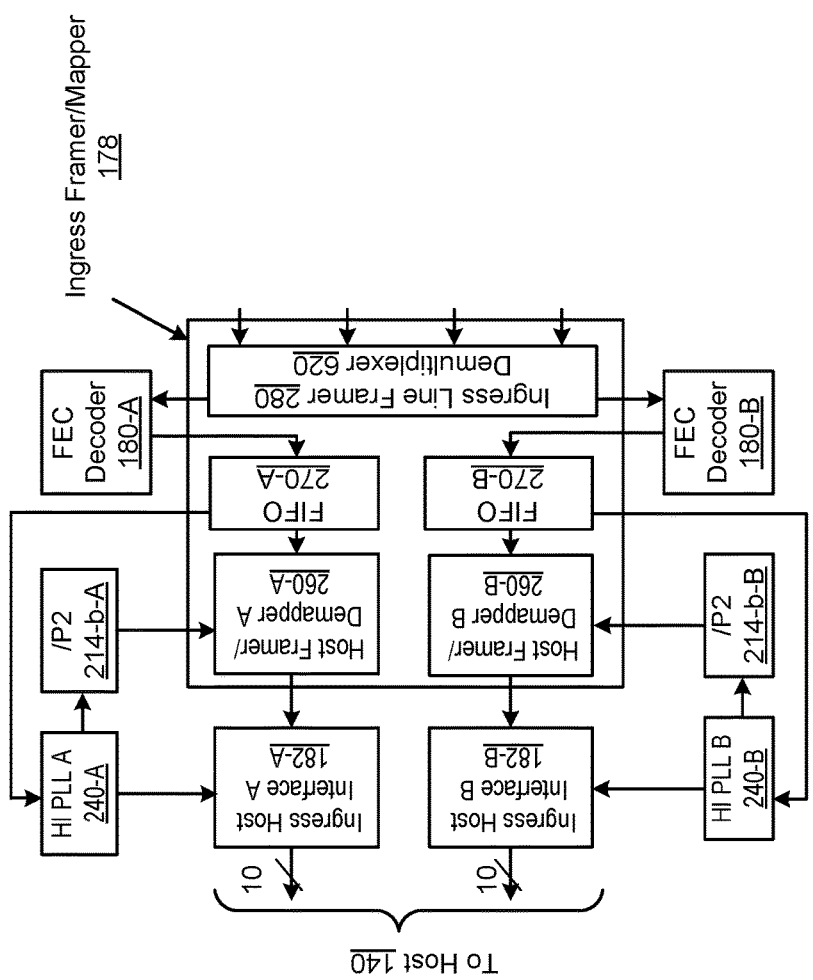

FIGS. 6c-6d illustrate clock routing and clock domains for each of separate host paths A and B of the muxponder architectures of FIGS. 6a-6b, respectively. As shown in FIG. 6c, along the egress path on the host side, distinct HE PLLs 230-A and 230-B and clock division circuitry (e.g., /P1 blocks 214-*a*-A and 214-*a*-B) provide clock signals to the two data stream lines A and B. Similarly, as shown in FIG. 6*d*, along the ingress path on the host side, distinct HI PLLs 240-A and 240-B and clock division circuitry (e.g., /P2 blocks 214-*b*-A and 214-*b*-B) provide clock signals to the two data stream lines A and B.

Figure 6E:
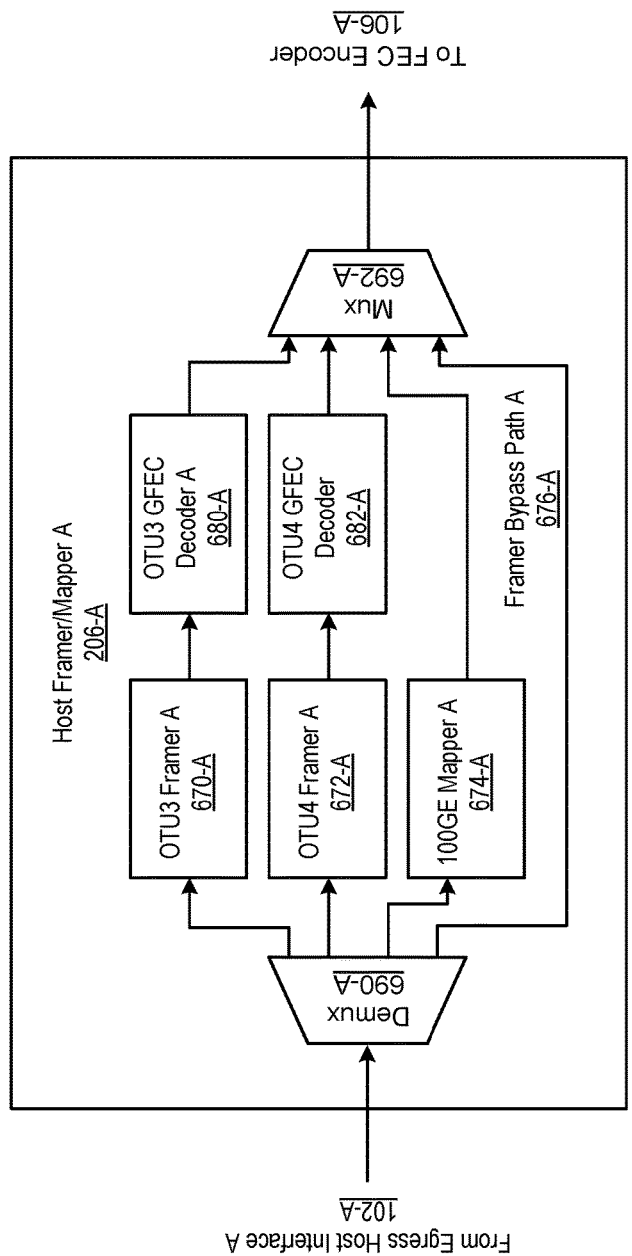

FIG. 6*e* illustrates components of host framer/mapper A 206-A along the egress path. Host framer/mapper B 206-B is similarly structured. The host framer/mapper 206-A includes a demultiplexer 690-A, an OTU3 Framer 670-A, an OTU4 Framer 672-A, a 100 GE Mapper 674-A, an OTU3 GFEC Decoder 680-A, an OTU4 GFEC Decoder 682-A, and a multiplexer 692-A. The demultiplexer 690-A demultiplexes the signal from the egress host interface 102-A and provides the signal to the OTU3 Framer 670-A, the OTU4 Framer 672-A, the 100 GE Mapper 674-A, or directly to the multiplexer 692-A along the framer bypass path 676-A depending on a programmable operating mode. If an OTU3 mode is selected, the OTU3 Framer performs framing according to an OTU3 standard and provides frames to the OTU3 GFEC decoder 680-A for error correction decoding. The signal is then provided to multiplexer 692-A. Similarly, if the OTU4 mode is selected, the OTU4 Framer 672-A performs framing according to an OTU4 standard and provides frames to the OTU4 GFEC decoder 682-A for error correction decoding. If the 100 GE mode is selected, 100 GE Mapper 674-A performs mapping and provides the mapped signal to multiplexer 692-A. If a bypass mode is selected, the demultiplexer 690-A provides the signal directly to multiplexer 692-A along the bypass path 676-A. The multiplexer 692-A selects the appropriate input according to the selected mode and provides the received signal to the FEC encoder 106-A.

Figure 6F:
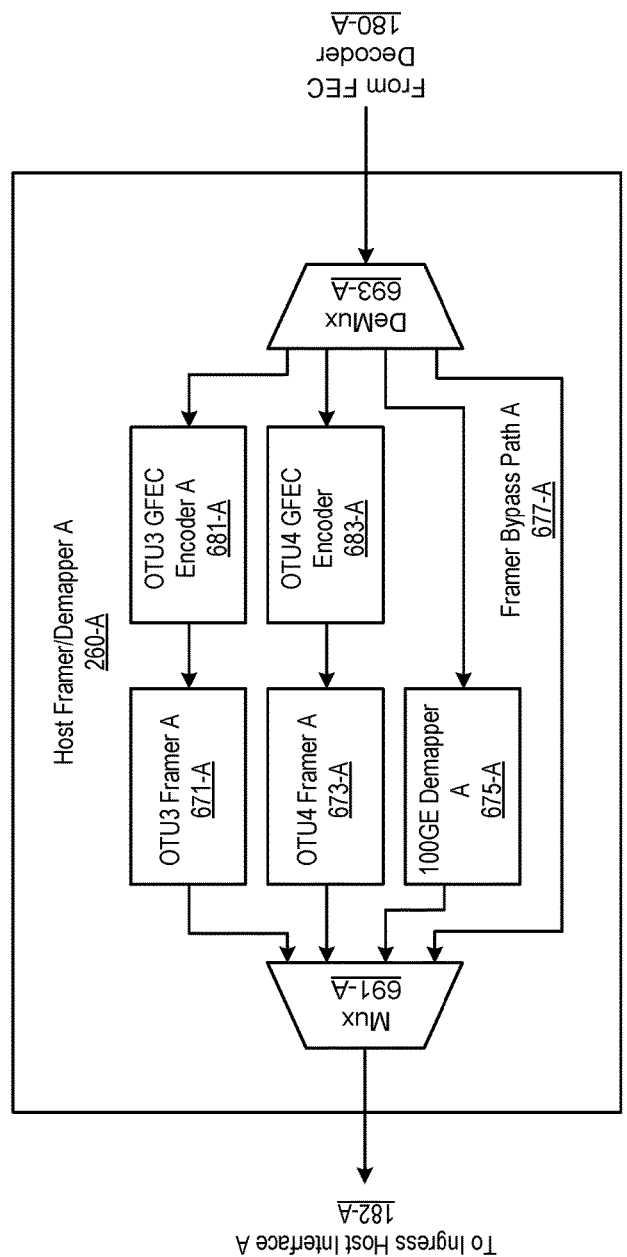

FIG. 6*f* similarly illustrates components of host framer/demapper A 260-A along the ingress path. Host framer/demapper B 260-B is similarly structured. The host framer/demapper 260-A includes a demultiplexer 693-A, an OTU3 GFEC Encoder 681-A, an OTU4 GFEC Encoder 683-A, a 100 GE Demapper 675-A, an OTU3 Framer 671-A, an OTU4 Framer 673-A, and a multiplexer 691-A. The demultiplexer 693-A demultiplexes a signal from the FEC decoder 180-A and provides the signal to the OTU3 GFEC Encoder 681-A, the OTU4 GFEC Encoder 683-A, the 100 GE Demapper 675-A, or directly to the multiplexer 691-A along the framer bypass path 677-A depending on a programmable operating mode. If an OTU3 mode is selected, the OTU3 GFEC Encoder 681-A encodes the signal according to an OTU3 GFEC encoding and provides the encoded signal to the OTU3 Framer 671-A to perform framing according to an OTU3 standard, and the framed signal is provided to multiplexer 691-A. If an OTU4 mode is selected, the OTU4 GFEC Encoder 683-A encodes the signal according to an OTU4 GFEC encoding and provides the encoded signal to the OTU4 Framer 673-A to perform framing according to an OTU4 standard, and the framed signal is provided to multiplexer 691-A. If a 100 GE mode is selected, 100 GE Demapper 675-A performs demapping and provides the demapped signal to multiplexer 692-A. If a bypass mode is selected, the demultiplexer 693-A provides the signal directly to multiplexer 691-A along the bypass path 677-A. The multiplexer 691-A selects the appropriate input according to the selected mode and provides the received signal to the Ingress Host Interface 182-A.

Placement of the GFEC codecs (680-A and 682-A in FIG. 6*e*; or 681-A and 683-A in FIG. 6*f*) is merely illustrative. In practice, GFEC codecs may be incorporated within the OTUk framer (670-A and 672-A in FIG. 6*e*; or 671-A and 673-A in FIG. 6*f*), not necessarily before or after a OTUk Framer. In other words, an OTUk Framer may use these GFEC codecs at some point when processing OTUk Frames. In one embodiment, both OTU4 and OTU3 Framers use the same GFEC codecs and the only difference is the coding rate.

In some embodiments, the transceiver is programmable to operate in several modes. For example, the host protocol is programmable between modes such as OTU3, OTU4, 100 GE, and non-standard protocols. In some embodiments, host GFEC handling is programmable between modes such as "terminate" and "do not handle." The FEC is also programmable between modes such as SDFEC, HFEC, GFEC, and bypass. Similarly, cycle slip correction may be programmable. The line modulation may also be programmable between modes such as DP-BPSK, DP-QPSK, DP-16QAM.

In one embodiment, the architecture described in FIGS. 6*a*-6*f* is a 100 G/200 G selectable architecture. In other words, the architecture can operate using Path A only, Path B only, or both Paths A and B. If either Path A or B is used alone with OTU4 protocol, the modulation may be 100 G DP-QPSK or 100 G DP-16QAM, with a max line data rate of 128 Gb/s. If both paths A and B are used with 2× OTU4, the modulation may be DP-16QAM with a max line data rate of 256 Gb/s. The amount in excess of the OTU4 data rates is to accommodate overhead for FEC, cycle slip correction, and asynchronous mapping. Where multiple options are available, unused blocks can be powered down to decrease power consumption and thermal dissipation.

In some embodiments, the transceiver is programmable to operate in several modes. For example, the host protocol is programmable between modes such as OTU3, OTU4, 100 GE, and non-standard protocols. In some embodiments, host GFEC handling is programmable between modes such as "terminate" and "do not handle." The FEC is also programmable between modes such as SDFEC, HFEC, GFEC, and bypass. Similarly, cycle slip correction may be programmable. The line modulation may also be programmable between modes such as DP-BPSK, DP-QPSK, DP-16QAM. Where multiple options are available, unused blocks can be powered down to decrease power consumption and thermal dissipation.

Figure 7A:
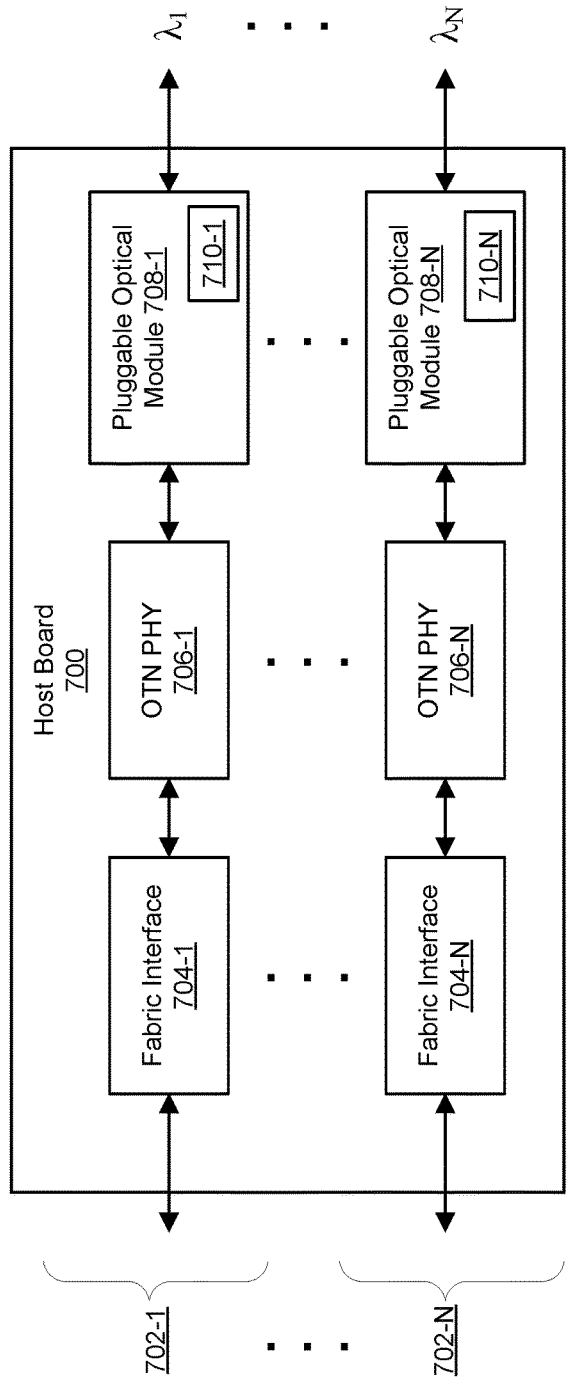
FIGS. 7a-7b include block diagrams of a host board for optical communication, in accordance with some embodiments.

FIG. 7*a* illustrates a block diagram of an embodiment of a packet optical transport platform (P-OTP) host board 700. The host board 700 comprises a plurality of channels 702-1, . . . 702-N, each corresponding to an optical wavelength. Each channel comprises a fabric interface 704, an optical transport network (OTN) physical layer processor (PHY) 706, and a pluggable optical module 708, which includes a transceiver 710 (with one or more properties or architectural components described above with reference to FIGS. 1-6). The host board 700 converts one or more client signals per channel onto optical wavelengths $\lambda_k$, k=1, . . . N, for transmission over an optical network. The fabric interface 704 provides an interface to a platform fabric (switching, etc.) via a backplane connector. The OTN PHY 706 performs mapping (i.e., converting the client signal into a format that is suitable for optical transmission), framing (i.e., dividing the transmitted signal into discrete, regular groupings or frames), and forward error correction (FEC). The client signals may be, for example, 10 G/100 G Ethernet signals, OTU2/OTU3/OTU4 signals, OC-192 signals, or other signal types. In one embodiment, the OTN PHY 706 maps the client signals onto 40 G OTU3, or 100 G OTU4 wavelengths, although compatibility with other data rates is also possible. In another embodiment, the OTN PHY 706 is replaced by a network processor (NP), which processes exclusively Ethernet clients (for example, 1 GE and 10 GE clients) and converts these into 40 G Ethernet or 100 G Ethernet signals which are sent to the pluggable optical modules 708. The pluggable optical modules 708 provide optics and interfacing electronics for interfacing to an optical network (e.g., a dense wavelength division multiplexing (DWDM) optical network).

Figure 7B:
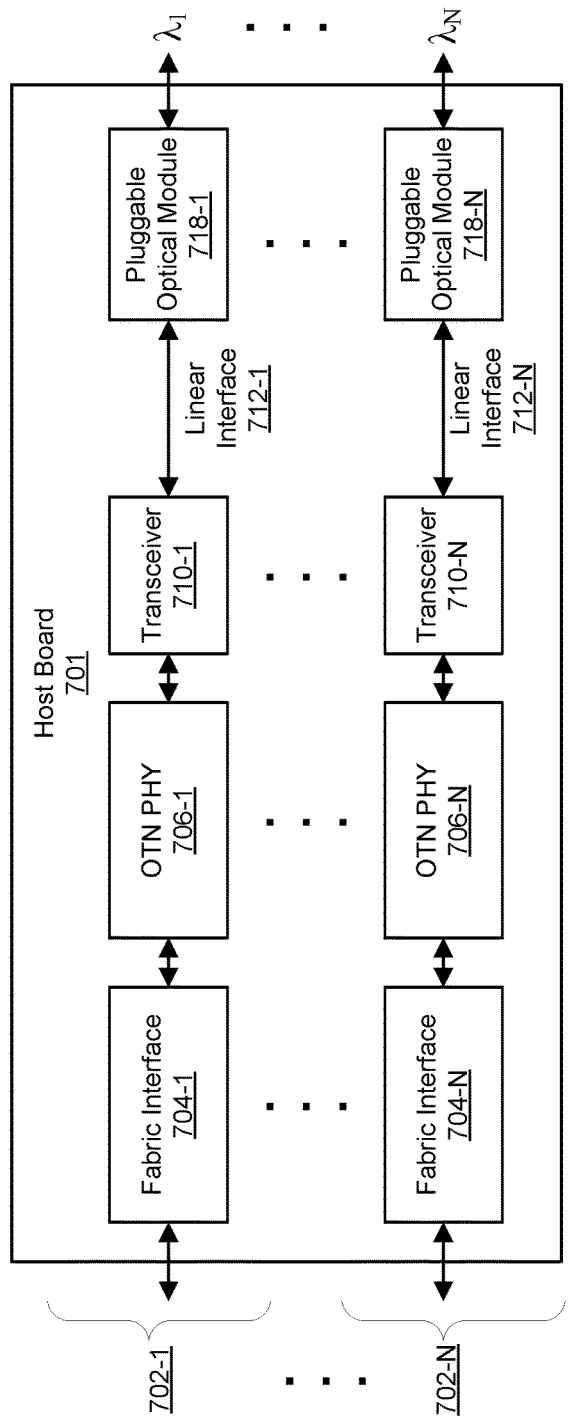

FIG. 7*b* illustrates an alternative embodiment of a host board 701. The host board 701 is similar to the host board 700 described above except that the transceiver 710 resides on the host board 701 outside of the pluggable optical module 718 (which in contrast to optical module 708 of FIG. 7*a*, lacks the transceiver 710). A linear analog interface 712 is included between the transceiver 710 and the optical module 718 to provide communication between the transceiver 710 and the pluggable optical module 718.

A benefit of the configuration of FIG. 7*b* is that it is simpler to dissipate power from the transceiver 710 when it is located on the host board 701, thus reducing cost and complexity of the optical modules 718, and simplifying the thermal management of the overall system. Furthermore, this approach potentially enables more ports per line card by reducing the footprint of the optical modules 718 and allowing more optical modules 718 to fit on a host board faceplate of a given size. On the other hand, this approach introduces bandwidth and other signal integrity impairments caused by the linear interface 712 and the electrical connector of the pluggable optical module 718. These impairments can be compensated by transmit pre-emphasis and receive equalization in the transceiver 710, as was described above.

Transceiver 710 is programmable to enable compatibility with both the architecture of host board 701 and the architecture of host board 700. Thus, the host board designer is afforded flexibility in the host board architecture and may determine the design that best suits the particular network application.

FIG. 8 illustrates a block diagram of an embodiment of a pluggable optical module 708 which includes the transceiver 710 and which may be used on a host board 700 having the architecture of FIG. 7*a*. In the illustrated embodiment, the pluggable optical module 708 comprises the transceiver 710 and an optics block 810 which comprises a transmit integrated tunable laser assembly (Tx iTLA) 812, a receive integrated tunable laser assembly (Rx iTLA) 818, an optical modulator 814, a driver 816, and a coherent receiver 820. Alternative embodiments may include different or additional components.

The pluggable optical module 708 receives transmit (Tx) data 824 (e.g., a digital electrical signal) from the host 822 (e.g., a component on the host board 100), processes the data 824, and generates a transmit (Tx) optical signal 830 for transmission over an optical fiber 828. Furthermore, the pluggable optical module 708 receives a receive (Rx) optical signal 832 from the optical fiber 828, processes the signal 832, and generates receive (Rx) data 826 (e.g., a digital electrical signal) provided to the host 822. In one embodiment, the pluggable optical module 708 is configured for communicating over an optical fiber 828 based on Indium Phosphide (InP) modulator technology. Alternatively, other technologies such as Lithium Niobate (LiNbO$_3$) modulator technology may be used.

The transceiver 710 of the pluggable optical module 708 may be programmable for compatibility with host signals conforming to various standards such as, for example, 100 GE, OTU4, OTU3, or other interfacing standards. For example, in one application mode the transceiver 710, the transceiver includes an interface that enables it to communicate directly with an Ethernet switch. Furthermore, the transceiver 710 of the pluggable optical module 708 may be programmable for compatibility with host signals with various data rates, error correction schemes, etc. The transceiver 710 of the pluggable optical module 708 has internal mapping and framing capability to translate the host interface protocol (for example, 100 GE) to the optical transmission protocol (for example, OTU4). The programmability of the transceiver 710 enables a pluggable optical module 708 that is compatible with a wide variety of host architectures that can be used in different types of optical networks.

In the transmit path of the pluggable optical module 708, the transceiver 710 modulates Tx data 824 received from the host 822 onto a signal vector (e.g., four signals) 892 representing quadrature (UQ) components for each of horizontal (H) and vertical (V) polarizations. These signals 892 are represented as HI, HQ, VI, and VQ. In the receive path, the transceiver 710 receives a signal vector (e.g., four signals) 894 represented as HI, HQ, VI, VQ from the coherent receiver 820 and performs signal processing functions such as, for example, equalization, timing recovery, and/or demodulation in order to generate Rx data 826. In one embodiment, the transceiver 710 may furthermore perform additional framing and error correction functions which may adjust the line rate from that used by the host 822.

In the optics block 810, the Tx iTLA generates an optical carrier signal and provides the optical carrier signal to the optical modulator 814. The driver 816 operates in combination with the optical modulator 814 to modulate the HI/HQ and VINQ signals onto optical carriers in horizontal and vertical polarizations respectively for transmission over the optical fiber 828. In the receive direction, the Rx iTLA 818 generates a local oscillator (LO) signal at approximately the carrier frequency of the received optical signal 832. The coherent receiver 820 receives the LO signal from the Rx iTLA 818 and demodulates the incoming optical signal 832 to baseband HI, HQ, VI, VQ signals 894 which are provided to the transceiver 710 for processing as described above.

In one embodiment, the transceiver 710 also provides a feedback signal 888 for automatic gain control (AGC) to the coherent receiver 820 based on the strength of the received signal vector 894. The AGC signal 888 may comprise a single signal or multiple signals (e.g., each corresponding to an individual signal in the received signal vector 894).

Figure 9:
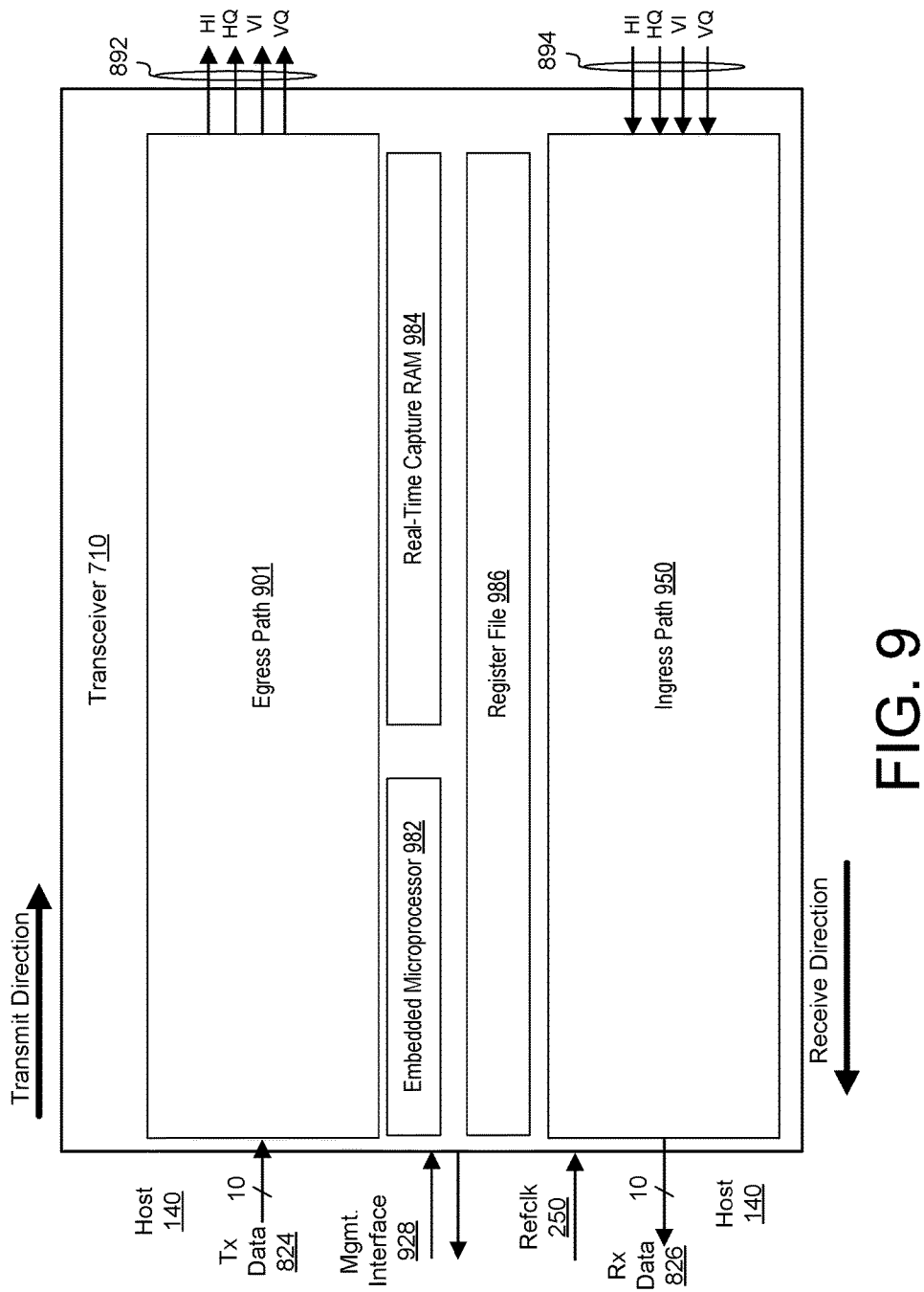
FIG. 9 is a block diagram of an embodiment of a programmable transceiver suitable for an optical communication system.

FIG. 9 illustrates an embodiment of the transceiver 710. In a transmit direction, the transceiver 710 receives digital data signals 824 from a host 140 and processes the received data to provide analog output signals 892 suitable for conversion to optical output signals for transmission over an optical network. In a receive direction, the transceiver 710 receives analog input signals 894 converted from optical signals received over the optical network, and processes the analog input signals 894 to recover the digital data signals 826.

In the transmit direction (egress path 901 which may be comprise the egress path discussed above in FIGS. 1-6) of the transceiver 710, a host demultiplexer (demux) receives the data signals 824 from the host 140 over a plurality of input channels (e.g., 10 channels). The host demultiplexer recovers the clocks from and demultiplexes the data signals 824 and may also perform various processing functions such as, for example, equalization, signal integrity monitoring and skew compensation. The host demultiplexer may be programmable to operate in accordance with a number of different interfacing standards such as, for example, CAUI (for 100 GE data), OTL4.10 (for OTU4 data), OTL3.4 (for OTU3 data), and other communication protocols. Various components and architectural details of the ingress path 910 correspond to various components and architectural details of ingress path architecture 101 described with reference to FIGS. 1*a* and 2*a*.

In the receive direction (ingress path 950 which may be comprise the ingress path discussed above in FIGS. 1-6) of the transceiver 710, a receive (Rx) analog front end receives analog signals 494 (HI, HQ, VI, VQ) and generates a digital representation of the signals for processing by a receive digital signal processor (Rx DSP). Various components and architectural details of the ingress path 950 correspond to various components and architectural details of ingress path architecture 150 described with reference to FIGS. 1*b* and 2*b*.

The embedded microprocessor 982, real-time capture random access memory (RAM) 984, and register file 986 perform various management and control functions and may interface to the host 140 via the management interface 928. For example, in one embodiment, the embedded microprocessor 982 may be used to upgrade or enhance the algorithms applied by the Tx DSP and/or Rx DSP, after the transceiver 710 has been shipped into the field. In another embodiment, the embedded microprocessor 982 may be used to estimate parameters of the optical channel (such as fiber length, polarization mode dispersion, or optical SNR) and provide such channel monitoring information to the host 140 in real time. In yet another embodiment, the embedded microprocessor 982 may be used to perform built in self-test (BIST) in the transceiver 710 as part of the manufacturing process; for example, by cycling through various modes of operation of the transceiver 710 while the transceiver 710 is connected in a line loopback configuration, wherein the line TX interface 892 is directly connected to the line RX interface 894 on the same configured transceiver 710.

In one embodiment, the transceiver 710 is implemented as an application specific integrated circuit (ASIC). Furthermore, portions of the transceiver 710 (e.g., the functional blocks of the digital signal processor) may be implemented as a processor and a non-transitory computer-readable storage medium that stores computer-executable instructions. During operation, the processor loads and executes the instructions to carry out the functions described herein. Other functional blocks of the transceiver 710 may be implemented in hardware, firmware, or a combination of software, hardware, and/or firmware.

In an alternative embodiment, the transmit path of the transceiver 710 described above (and relevant management blocks) may be implemented as a standalone transmitter that does not necessarily have a receiver integrated in the same device. Furthermore, in another alternative embodiment, the receive path of the transceiver 710 described above (and relevant management blocks) may be implemented as a standalone receiver that does not necessarily have a transmitter integrated in the same device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A transmitter, comprising:
   an egress signal path comprising an egress line-side interface and an egress host-side interface, the egress signal path configured to receive a digital transmit signal at the egress host-side interface, to modulate the digital transmit signal to generate a modulated digital transmit signal, to convert the modulated digital transmit signal to an analog signal vector, and to output the analog signal vector corresponding to the digital transmit signal at the egress line-side interface, the egress signal path comprising a plurality of different egress path clock domains operating according to different egress path clock signals having different clock rates;
   an egress-side data storage buffer between two adjacent egress path clock domains, the egress-side data storage buffer configured to prevent loss of data samples when an egress path signal transitions between the two adjacent egress path clock domains; and
   clock and timing circuitry configured to receive a single reference clock signal, to generate the plurality of egress path clock signals from the single reference clock, and to provide the plurality of egress path clock signals to different components of the egress signal path in the plurality of different egress path clock domains.

2. The transmitter of claim 1, further comprising:
   a fabric interface to receive an input data signal from a host device;
   a physical layer processor to map and frame the input data signal into the digital transmit signal; and
   an optical module to convert the analog signal vector to an optical signal suitable for transmission over an optical network operating at 100 Gigahertz or higher.

3. The transmitter of claim 1, wherein the plurality of different egress path clock domains comprises:
   an egress host interface clock domain including the egress host-side interface operating at a first sampling rate according to a first clock signal;
   an egress digital signal processor clock domain including an egress digital signal processor operating at a second sampling rate according to a second clock signal, the egress digital signal processor to modulate the digital transmit signal; and
   a digital-to-analog converter clock domain including a digital-to-analog converter operating at a third sampling rate according to a third clock signal, the digital-to-analog converter to output the analog signal vector to the egress line-side interface, wherein the first sample rate, the second sampling rate, and the third sampling rate are different.

4. The transmitter of claim 3, wherein the egress digital signal processor clock domain further comprises:
   an egress interpolator filter to perform a sampling rate conversion between samples processed in the digital signal processor clock domain and samples provided to the digital-to-analog converter clock domain.

5. The transmitter of claim 3, wherein the second clock signal of the digital signal processing clock domain and the third clock signal of the digital-to-analog converter clock domain are rationally related.

6. The transmitter of claim 1, wherein the egress-side data storage buffer between the two adjacent egress path clock domains provides a feedback signal based on a buffer fill level, the feedback signal to adjust a frequency of one of the egress path clock signals provided to at least one of the two adjacent egress path clock domains.

7. The transmitter of claim 1, wherein the clock and timing circuitry comprises:
an egress line-side phase locked loop to receive the single reference clock signal and to generate an egress line-side reference clock; and
one or more clock frequency divider elements coupled to the egress line-side phase locked loop to generate at least one of the plurality of egress path clock signals based on the egress line-side reference clock.

8. The transmitter of claim 1, wherein the clock and timing circuitry comprises:
an egress host-side phase locked loop to receive the single reference clock signal and to generate an egress host-side reference clock; and
one or more clock frequency divider elements coupled to the egress host-side phase locked loop to generate at least one of the plurality of egress path clock signals based on the egress host-side reference clock.

9. A receiver, comprising:
an ingress signal path comprising an ingress line-side interface and an ingress host-side interface, the ingress signal path configured to receive an analog signal vector at the ingress line-side interface, to convert the analog signal vector to a digital signal vector, to demodulate the digital signal vector to generate a digital receive signal, and to output the digital receive signal at the ingress host-side interface, the ingress signal path comprising a plurality of different ingress path clock domains operating according to different ingress path clock signals having different clock rates;
an ingress-side data storage buffer between two adjacent ingress path clock domains, the ingress-side data storage buffer configured to prevent loss of data samples when an ingress path signal transitions between the two adjacent ingress path clock domains; and
clock and timing circuitry configured to receive a single reference clock signal, to generate the plurality of ingress path clock signals from the single reference clock, and to provide the plurality of ingress path clock signals to different components of the ingress signal path in the plurality of different ingress path clock domains.

10. The receiver of claim 9, further comprising:
an optical module to convert an optical signal received over an optical network operating at 100 Gigahertz or higher to the analog signal vector;
a physical layer processor to de-map and de-frame the digital receive signal into an output data signal; and
a fabric interface to transmit the output data signal to a host device.

11. The receiver of claim 9, wherein the plurality of ingress path clock domains comprises:
an ingress analog-to-digital converter clock domain including an analog-to-digital converter operating at a first sampling rate according to a first clock signal, the analog-to-digital converter to convert the analog signal vector to the digital signal vector;
an ingress digital signal processor clock domain including an ingress digital signal processor operating at a second sampling rate according to a second clock signal, the ingress digital signal processor to demodulate the digital signal vector to generate the digital receive signal; and
an ingress host interface clock domain including an ingress host interface operating at a third sampling rate according to a third clock signal, the ingress host interface to output the digital receive signal, wherein the first, second, and third sampling rates are different.

12. The receiver of claim 11, wherein the ingress digital signal processor clock domain further comprises:
an ingress interpolator filter to perform a sampling rate conversion between samples received from the analog-to-digital converter clock domain and samples processed in the ingress digital signal processor clock domain.

13. The receiver of claim 12, wherein the ingress interpolator filter receives an input block size having a variable number of input samples and outputs an output block having a fixed number of samples based on a parallelization factor.

14. The receiver of claim 11, wherein the second clock of the digital signal processing clock domain and the first clock of the analog-to-digital converter clock domain are rationally related.

15. The receiver of claim 9, wherein the ingress-side data storage buffer provides a feedback signal representing a buffer fill level, the feedback signal to adjust a frequency of one of the plurality of ingress clock signals.

16. The receiver of claim 9, wherein the clock and timing circuitry comprises:
an ingress line-side phase locked loop to receive the single reference clock signal and to generate an ingress line-side reference clock; and
one or more clock frequency divider elements coupled to the ingress line-side phase locked loop to generate at least one of the plurality of ingress clock signals based on the ingress line-side reference clock.

17. The receiver of claim 9, wherein the clock and timing circuitry comprises:
an ingress host-side phase locked loop to receive the single reference clock signal and to generate an ingress host-side reference; and
one or more clock frequency divider elements coupled to the ingress host-side phase locked loop to generate at least one of the plurality of ingress clock signals based on the ingress host-side reference clock.

18. The receiver of claim 9, wherein the ingress signal path further comprises a plurality of carrier recovery stages including:
a coarse carrier recovery stage configured to determine and compensate for frequency offsets in a carrier signal of the digital receive signal greater than a specified threshold;
a feedback fine carrier recovery stage following the coarse carrier recovery stage, the feedback fine carrier recovery stage comprising a phase domain decision directed phase locked loop to further correct for offsets in the carrier signal; and
a feedforward fine carrier recovery stage following the feedback fine carrier recovery stage to perform a blind phase search carrier recovery to further correct for the offsets in the carrier signal.

19. A transceiver, comprising:
an egress signal path comprising an egress line-side interface and an egress host-side interface, the egress signal path configured to receive a digital transmit signal at the egress host-side interface, to modulate the digital transmit signal to generate a modulated digital transmit signal, to convert the modulated digital transmit signal to an analog transmit signal vector, and to output the analog transmit signal vector corresponding to the digital transmit signal at the egress line-side interface, the egress signal path comprising a plurality of different egress path clock domains operating according to different egress path clock signals having different clock rates;

an egress-side data storage buffer between two adjacent egress path clock domains, the egress-side data storage buffer configured to prevent loss of data samples when an egress path signal transitions between the two adjacent egress path clock domains;

an ingress signal path comprising an ingress line-side interface and an ingress host-side interface, the ingress signal path configured to receive an analog receive signal vector at the ingress line-side interface, to cover the analog receive signal vector to a digital receive signal vector, to demodulate the digital receive signal vector to generate a digital receive signal, and to output a digital receive signal at the ingress host-side interface, the ingress signal path comprising a plurality of different ingress path clock domains operating according to different ingress path clock signals having different clock rates;

an ingress-side data storage buffer between two adjacent ingress path clock domains, the ingress-side data storage buffer configured to prevent loss of data samples when an ingress path signal transitions between the two adjacent ingress path clock domains; and clock and timing circuitry configured to receive a single reference clock signal, to generate the plurality of ingress path clock signals and the plurality of egress path clock signals from the single reference clock, to provide the plurality of ingress path clock signals to different components of the ingress signal path in the plurality of different ingress path clock domains, and to provide the plurality of egress path clock signals to different components of the egress signal path in the plurality of different egress path clock domains.

20. The transceiver of claim 19, further comprising:

a fabric interface to receive an input transmit signal from a host device and to transmit an output receive signal to the host device;

a physical layer processor to map and frame the input transmit signal into the digital transmit signal, and to de-map and de-frame the digital receive signal into the output receive signal; and an optical module to convert the analog transmit signal vector to an optical transmit signal suitable for transmission over an optical network operating at 100 Gigahertz or higher, and to covert an optical receive signal received over the optical network to the analog receive signal vector.

* * * * *